US010486286B2

(12) United States Patent
Kitahata et al.

(10) Patent No.: US 10,486,286 B2
(45) Date of Patent: Nov. 26, 2019

(54) LOW-RIGIDITY WORKPIECE MACHINING ASSISTANCE SYSTEM

(71) Applicant: KAWASAKI JUKOGYO KABUSHIKI KAISHA, Kobe-shi, Hyogo (JP)

(72) Inventors: Takashi Kitahata, Kobe (JP); Hideo Kawahara, Akashi (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 325 days.

(21) Appl. No.: 15/108,336

(22) PCT Filed: Dec. 26, 2014

(86) PCT No.: PCT/JP2014/006505
§ 371 (c)(1),
(2) Date: Jun. 27, 2016

(87) PCT Pub. No.: WO2015/098126
PCT Pub. Date: Jul. 2, 2015

(65) Prior Publication Data
US 2016/0318151 A1    Nov. 3, 2016

(30) Foreign Application Priority Data
Dec. 26, 2013 (JP) .................. 2013-269791

(51) Int. Cl.
*B24B 41/06*        (2012.01)
*B23Q 1/76*         (2006.01)
*G05B 19/402*       (2006.01)

(52) U.S. Cl.
CPC ............. *B24B 41/06* (2013.01); *B23Q 1/766* (2013.01); *G05B 19/402* (2013.01); *G05B 2219/40154* (2013.01)

(58) Field of Classification Search
CPC ......... B24B 41/06; B24B 47/26; B23B 47/00; B23C 3/00; B23C 9/00; B23Q 1/766; G05F 19/402
See application file for complete search history.

(56) References Cited

U.S. PATENT DOCUMENTS 8,092,357 B1 *   1/2012   Buus ................ B23B 39/06
                                                   483/41
2001/0042453 A1 * 11/2001   Schneider .......... B21C 51/005
                                                   101/28

(Continued)

FOREIGN PATENT DOCUMENTS

JP    H07-116743 A    5/1995
JP    H10-118884 A    5/1998

(Continued)

OTHER PUBLICATIONS

Mar. 31, 2015 Written Opinion of the International Searching Authority issued in International Patent Application No. PCT/JP2014/006505.

(Continued)

*Primary Examiner* — Robert E Fennema
*Assistant Examiner* — Santosh R Poudel
(74) *Attorney, Agent, or Firm* — Oliff PLC

(57) ABSTRACT

A machining assistance system for assisting a machining apparatus includes: a workpiece supporting force generating unit, which generates workpiece supporting force against machining reaction force that is exerted on a machining portion of a workpiece by a working tool; a supporting device, which moves the supporting force generating unit while supporting the supporting force generating unit; and a workpiece supporting force control device, which controls operation of the workpiece supporting force generating unit and operation of the supporting device based on machining reaction force related data related to the machining reaction (Continued)

force and machining position related data related to a machining position of the working tool, such that the workpiece supporting force generating unit exerts the workpiece supporting force on the workpiece against the machining reaction force.

10 Claims, 17 Drawing Sheets

(56) References Cited

U.S. PATENT DOCUMENTS

| | | | | |
|---|---|---|---|---|
| 2006/0039765 A1* | 2/2006 | Hamann | ............... | B23Q 1/766 408/87 |
| 2006/0273140 A1* | 12/2006 | Ghosh | ................. | B23K 20/125 228/112.1 |
| 2007/0187466 A1* | 8/2007 | Sayama | .............. | B23K 20/126 228/101 |
| 2007/0274797 A1* | 11/2007 | Panczuk | ................. | B23Q 1/01 409/131 |
| 2011/0089146 A1* | 4/2011 | Takahashi | ............. | B23K 11/115 219/91.2 |
| 2011/0180516 A1* | 7/2011 | Takahashi | ............. | B23K 11/115 219/86.41 |
| 2011/0282483 A1* | 11/2011 | Simonetti | ............ | G05B 19/402 700/114 |
| 2014/0186558 A1* | 7/2014 | Lee | ....................... | B29C 70/462 428/34.1 |
| 2014/0216216 A1* | 8/2014 | Hessenkamper | ..... | B23B 29/125 82/1.11 |
| 2015/0051728 A1* | 2/2015 | Kim | ................... | G05B 19/4061 700/175 |
| 2015/0134102 A1* | 5/2015 | Schuon | .............. | G05B 19/4061 700/160 |

FOREIGN PATENT DOCUMENTS

| | | |
|---|---|---|
| JP | H11-323527 A | 11/1999 |
| WO | 2013/151064 A1 | 10/2013 |

OTHER PUBLICATIONS

Mar. 31, 2015 Search Report issued in International Patent Application No. PCT/JP2014/006505.

Oct. 9, 2017 Extended Search Report issued in European Patent Application No. 14875324.7.

\* cited by examiner (BEFORE SPRAYING) (DURING SPRAYING) (AFTER SPRAYING)

LOW-RIGIDITY WORKPIECE MACHINING ASSISTANCE SYSTEM

TECHNICAL FIELD

The present invention relates to a machining assistance system, and particularly to a machining assistance system for assisting in machining a low-rigidity workpiece, such as a thin plate or a thin-wall cylinder.

BACKGROUND ART

Generally in machining work, a machine tool is used in the machining, in which a workpiece, i.e., a machining target object, and a working tool are moved (i.e., rotated or linearly moved) relative to each other, and the workpiece is machined into an intended shape. In recent years, NC machine tools, the machining by which is automated by numerical control, are mainly used.

Recently, various technologies for assisting in the machining have been developed. For example, there is a disclosed system for removing remaining chips after machining by a machining center (see Patent Literature 1, for example).

CITATION LIST

Patent Literature

PTL 1: Japanese Laid-Open Patent Application Publication No. H10-118884

SUMMARY OF INVENTION

Technical Problem

In the case of machining a low-rigidity workpiece such as a thin plate or a thin-wall cylinder, a cutting error or the like tends to occur, which is due to vibration, deformation, etc., of the workpiece caused by machining reaction force. Therefore, it is conceivable to take a measure, for example, reducing cutting conditions such as the amount of cutting and the feed speed, or cutting-to-zero, i.e., cutting the same portion twice. However, adopting such a method causes a reduction in machining efficiency.

The present invention has been made to solve the above-described problems. An object of the present invention is, in machining a low-rigidity workpiece, to prevent a reduction in machining precision due to deformation of the workpiece while suppressing a reduction in production efficiency.

Solution to Problem

In order to solve the above-described problems, a machining assistance system according to one aspect of the present invention is a system for assisting a machining apparatus, the machining apparatus including: a workpiece retaining tool that retains a workpiece; a machining unit that machines the workpiece retained by the workpiece retaining tool by driving a working tool; and a machining control device that performs control of moving the machining unit relative to the workpiece retaining tool to position the working tool at a machining position. The machining assistance system includes: a workpiece supporting force generating unit that generates workpiece supporting force against machining reaction force that is exerted on a machining portion of the workpiece by the working tool; a supporting device that moves the supporting force generating unit while supporting the supporting force generating unit; and a workpiece supporting force control device that controls operation of the workpiece supporting force generating unit and operation of the supporting device based on machining reaction force related data related to the machining reaction force and machining position related data related to the machining position of the working tool, such that the workpiece supporting force generating unit exerts the workpiece supporting force on the workpiece against the machining reaction force.

According to the above-described configuration, the workpiece supporting force generating unit generates workpiece supporting force against machining reaction force that is exerted on the machining portion of the workpiece by the working tool, and the supporting device moves the supporting force generating unit while supporting the supporting force generating unit. The workpiece supporting force control device controls the operation of the workpiece supporting force generating unit and the operation of the supporting device based on the machining reaction force related data and the machining position related data, such that the workpiece supporting force generating unit exerts the workpiece supporting force on the workpiece against the machining reaction force. Accordingly, by controlling the workpiece supporting force to substantially match the machining reaction force, even if the workpiece is a low-rigidity workpiece, deformation of the workpiece due to the machining reaction force can be prevented. Consequently, a reduction in machining precision due to deformation of the workpiece can be prevented. Since it is not necessary to, for example, reduce the machining conditions, a reduction in production efficiency can be suppressed.

The machining reaction force herein means force that is exerted from the working tool to the workpiece at the time of machining. For example, in the case of cutting work, cutting resistance is exerted from the workpiece to the working tool. In this case, reaction force against the cutting resistance, the reaction force being exerted from the working tool to the workpiece, is the machining reaction force (cutting reaction force).

The machining unit may be configured to perform machining of the workpiece retained by the workpiece retaining tool by causing a columnar or discoid rotating tool with a cutting edge or grinding stone formed on its peripheral surface or distal end surface to rotate about a central axis of the rotating tool. The workpiece supporting force generating unit may include a columnar rotary body and a rotation driver that causes the rotary body to rotate about a central axis of the rotary body. The workpiece supporting force control device may be configured to, based on the machining reaction force related data and the machining position related data and by using the supporting device, perform: control of an orientation and a position of the workpiece supporting force generating unit, such that the central axis of the rotary body is parallel to the central axis of the rotating tool, and the rotary body exerts pushing force on the workpiece against cutting reaction force that is exerted on the workpiece by the rotating tool; and control of operation of the rotation driver to cause the rotary body to rotate, such that a rotational torque is exerted on the workpiece against a torque that is generated by the cutting reaction force. The machining herein includes cutting and grinding.

According to the above configuration, in the case where the machining apparatus is an apparatus for performing machining of the workpiece by the rotating tool, based on the machining reaction force related data and the machining position related data and by using the supporting device, the workpiece supporting force control device performs: control of the orientation and the position of the workpiece supporting force generating unit, such that the central axis of the rotary body is parallel to the central axis of the rotating tool, and the rotary body exerts pushing force on the workpiece against cutting reaction force that is exerted on the workpiece by the rotating tool; and control of the operation of the rotation driver to cause the rotary body to rotate, such that a rotational torque is exerted on the workpiece against a torque that is generated by the cutting reaction force. Therefore, in the case where the machining apparatus is an apparatus for performing machining of the workpiece by the rotating tool, even if the workpiece is a low-rigidity workpiece, a reduction in machining precision due to deformation of the workpiece can be prevented while suppressing a reduction in production efficiency.

(Side Surface Cutting: End Mill)

The machining unit may be configured to perform cutting of a side surface of the workpiece retained by the workpiece retaining tool by causing a columnar rotating cutting tool with a cutting edge formed on its peripheral surface to rotate about a central axis of the rotating cutting tool, and the workpiece supporting force control device may be configured to, based on the machining reaction force related data and the machining position related data and by using the supporting device, perform: control of the orientation and the position of the workpiece supporting force generating unit, such that the central axis of the rotary body is parallel to the central axis of the rotating cutting tool, a peripheral surface of the rotary body faces the peripheral surface of the rotating cutting tool with the workpiece positioned in between, and the peripheral surface of the rotary body exerts pushing force on the workpiece against cutting reaction force that is exerted on the workpiece by the rotating cutting tool; and control of operation of the rotation driver to cause the rotary body to rotate in the same direction as a rotation direction of the rotating cutting tool, such that a rotational torque is exerted on the workpiece against a torque that is generated by the cutting reaction force.

According to the above configuration, in the case where the machining apparatus is an apparatus for performing cutting of a side surface of the workpiece by the rotating cutting tool, based on the machining reaction force related data and the machining position related data and by using the supporting device, the workpiece supporting force control device performs: control of the orientation and the position of the workpiece supporting force generating unit, such that the central axis of the rotary body is parallel to the central axis of the rotating cutting tool, the peripheral surface of the rotary body faces the peripheral surface of the rotating cutting tool with the workpiece positioned in between, and the peripheral surface of the rotary body exerts pushing force on the workpiece against cutting reaction force that is exerted on the workpiece by the rotating cutting tool; and control of the operation of the rotation driver to cause the rotary body to rotate in the same direction as the rotation direction of the rotating cutting tool, such that a rotational torque is exerted on the workpiece against a torque that is generated by the cutting reaction force. Therefore, in the case where the machining apparatus is an apparatus for performing cutting of a side surface of the workpiece by the rotating cutting tool, even if the workpiece is a low-rigidity workpiece, a reduction in machining precision due to deformation of the workpiece can be prevented while suppressing a reduction in production efficiency.

(Front Surface Cutting: Milling, Hole Machining: Drilling)

The machining unit may be configured to perform cutting of a surface of the workpiece retained by the workpiece retaining tool by causing a columnar rotating cutting tool with a cutting edge formed on its distal end surface to rotate about a central axis of the rotating cutting tool, and the workpiece supporting force control device may be configured to, based on the machining reaction force related data and the machining position related data and by using the supporting device, perform: control of the orientation and the position of the workpiece supporting force generating unit, such that the central axis of the rotary body is parallel to the central axis of the rotating cutting tool, a distal end surface of the rotary body faces the distal end surface of the rotating cutting tool with the workpiece positioned in between, and the distal end surface of the rotary body exerts pushing force on the workpiece against cutting reaction force that is exerted on the workpiece by the rotating cutting tool; and control of operation of the rotation driver to cause the rotary body to rotate in a direction reverse to a rotation direction of the rotating cutting tool, such that a rotational torque is exerted on the workpiece against a torque that is generated by the cutting reaction force.

According to the above-described configuration, in the case where the machining apparatus is an apparatus for performing milling or hole machining on a surface of the workpiece by the rotating cutting tool, based on the machining reaction force related data and the machining position related data and by using the supporting device, the workpiece supporting force control device performs: control of the orientation and the position of the workpiece supporting force generating unit, such that the central axis of the rotary body is parallel to the central axis of the rotating cutting tool, the distal end surface of the rotary body faces the distal end surface of the rotating cutting tool with the workpiece positioned in between, and the distal end surface of the rotary body exerts pushing force on the workpiece against cutting reaction force that is exerted on the workpiece by the rotating cutting tool; and control of the operation of the rotation driver to cause the rotary body to rotate in the direction reverse to the rotation direction of the rotating cutting tool, such that a rotational torque is exerted on the workpiece against a torque that is generated by the cutting reaction force. Therefore, in the case where the machining apparatus is an apparatus for performing milling or hole machining on a surface of the workpiece by the rotating cutting tool, even if the workpiece is a low-rigidity workpiece, a reduction in machining precision due to deformation of the workpiece can be prevented while suppressing a reduction in production efficiency.

(Grinding)

The machining unit may be configured to perform grinding of a side surface of the workpiece retained by the workpiece retaining tool by causing a discoid rotating grinding tool with grinding stone formed on its peripheral surface to rotate about a central axis of the rotating grinding tool, and the workpiece supporting force control device may be configured to, based on the machining reaction force related data and the machining position related data and by using the supporting device, perform: control of the orientation and the position of the workpiece supporting force generating unit, such that the central axis of the rotary body is parallel to the central axis of the rotating grinding tool, and the rotary body exerts pushing force on the workpiece against grinding reaction force that is exerted on the workpiece by the rotating grinding tool; and control of operation of the rotation driver to cause the rotary body to rotate, such that a rotational torque is exerted on the workpiece against a torque that is generated by the grinding reaction force.

According to the above configuration, in the case where the machining apparatus is an apparatus for performing grinding of a side surface of the workpiece by the rotating grinding stone, based on the machining reaction force related data and the machining position related data and by using the supporting device, the workpiece supporting force control device performs: control the orientation and the position of the workpiece supporting force generating unit, such that the central axis of the rotary body is parallel to the central axis of the rotating grinding tool, and the rotary body exerts pushing force on the workpiece against grinding reaction force that is exerted on the workpiece by the rotating grinding tool; and control of the operation of the rotation driver to cause the rotary body to rotate, such that a rotational torque is exerted on the workpiece against a torque that is generated by the grinding reaction force. Therefore, in the case where the machining apparatus is an apparatus for performing grinding of a side surface of the workpiece by the rotating grinding stone, even if the workpiece is a low-rigidity workpiece, a reduction in machining precision due to deformation of the workpiece can be prevented while suppressing a reduction in production efficiency.

The machining assistance system may further include a dynamometer that detects motive power exerted on the workpiece, and the machining reaction force related data may be the motive power detected by the dynamometer.

According to the above configuration, the motive power exerted on the workpiece during the machining is directly detected in real time by the dynamometer. This makes it possible to perform accurate feedback control of the workpiece supporting force by using the motive power detected by the dynamometer. For example, in the case of cutting work, the motive power exerted on the workpiece is detected by the dynamometer, and feedback control of the workpiece supporting force is performed, such that the value of the detected motive power is kept to zero.

The machining unit may include the working tool and a motor that drives the working tool. The machining assistance system may further include a current sensor that detects an electric current flowing through the motor. The machining reaction force related data may be a current value of the electric current flowing through the motor, the electric current being detected by the current sensor.

According to the above configuration, the current value of the motor driving the working tool is a value corresponding to the machining reaction force. Accordingly, the machining reaction force exerted on the workpiece during the machining is indirectly detected in real time by the current sensor. This makes it possible to perform feedforward control of the workpiece supporting force by using the motor current value detected by the current sensor.

The machining assistance system may further include a vibration meter that is provided on the workpiece retaining tool and that measures vibration of the workpiece retained by the workpiece retaining tool, and the machining reaction force related data may be the vibration measured by the vibration meter.

According to the above configuration, the vibration of the workpiece corresponds to the machining reaction force exerted on the workpiece. Accordingly, the machining reaction force exerted on the workpiece during the machining is indirectly measured in real time by the vibration meter. This makes it possible to perform feedback control of the workpiece supporting force by using the vibration measured by the vibration meter. Consequently, vibration of the workpiece can be suppressed. (It should be noted that since the number of chattering vibrations differs at each machining position, the strength of the pushing force exerted by the supporting force generating unit may be changed for each machining position.)

The machining assistance system may further include a memory for storing the machining reaction force related data. The workpiece supporting force control device may control the operation of the workpiece supporting force generating unit and the operation of the supporting device based on the machining position related data and the machining reaction force related data stored in the memory.

According to the above configuration, the machining reaction force for each machining position is experimentally or theoretically estimated in advance, and the workpiece supporting force can be controlled based thereon. This makes it possible to eliminate the devices for detecting the machining reaction force and simplify the machining assistance system. For example, in the case of experimentally estimating machining reaction force for cutting work, cutting resistance may be measured by a dynamometer in advance, and cutting reaction force estimated based on experimental data may be stored.

The supporting device may be an articulated arm robot that retains the workpiece supporting force generating unit by a hand, and the workpiece supporting force control device may be configured to control operation of the articulated arm robot and the operation of the workpiece supporting force generating unit.

The machining portion of a surface of the workpiece may be coated with a film that increases rigidity of the workpiece and that is machinable together with the workpiece. In this case, the following pre-machining treatment may be performed: coating the machining portion of the surface of the workpiece with a film made of, for example, foamed resin or low-melting alloy. According to the above configuration, the rigidity of the machining portion of the surface of the workpiece is increased, and thereby vibration during machining can be prevented.

Advantageous Effects of Invention

The present invention produces an advantageous effect of being able to prevent, in machining a low-rigidity workpiece, a reduction in machining precision due to deformation of the workpiece while suppressing a reduction in production efficiency

DESCRIPTION OF EMBODIMENTS

Figure 1:
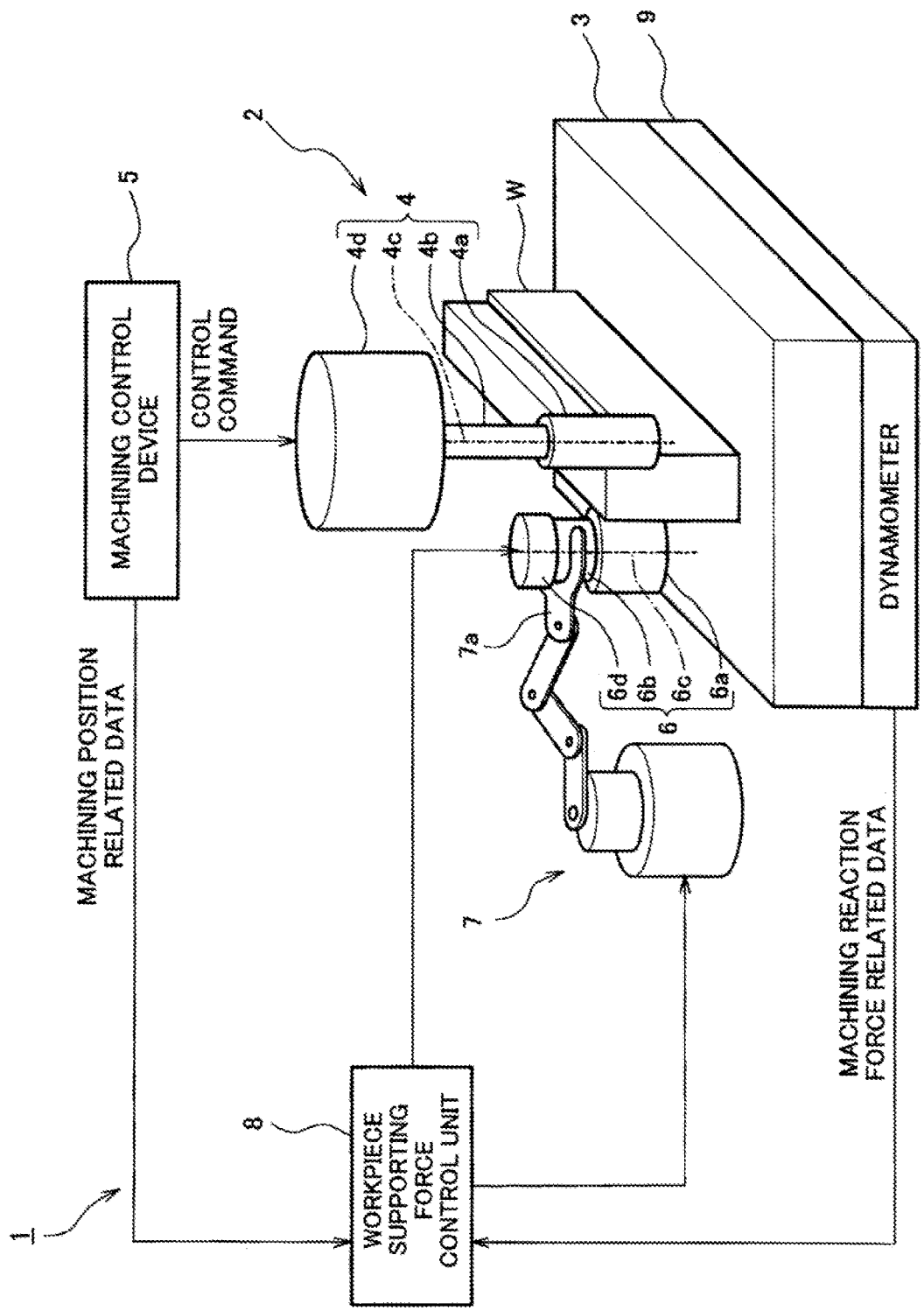
FIG. 1 is a block diagram showing the configuration of a machining assistance system according to Embodiment 1 of the present invention.

Hereinafter, embodiments of the present invention are described with reference to the drawings. In the drawings, the same or corresponding elements are denoted by the same reference signs, and repeating the same descriptions is avoided below. It should be noted that, variations of the embodiments described below are denoted by common serial numbers.

Embodiment 1

FIG. 1 is a block diagram showing the configuration of a machining assistance system according to Embodiment 1 of the present invention. As shown in FIG. 1, a machining assistance system 1 is a system for assisting a machining apparatus 2, which performs machining of a workpiece W automatically.

First, the configuration of the machining apparatus 2 is described. The machining apparatus 2 includes: a workpiece retaining tool 3, which retains the workpiece W; a machining unit 4; and a machining control device 5. In the present embodiment, the machining apparatus 2 is, for example, a machining center capable of performing different types of machining in accordance with the purpose of the machining, such as side surface cutting, front surface cutting, hole machining, and grinding.

The workpiece retaining tool 3 may be any tool, so long as it is capable of retaining the workpiece W. The workpiece retaining tool 3 includes, for example, a base and a mechanism that fixes the workpiece W on the base. Although the workpiece W is not limited to a particular type of workpiece, the less the rigidity of the workpiece W is, the more the functional advantages of the present invention are exerted. The workpiece W, i.e., a machining target object in the present embodiment, is, for example, in the shape of a thin plate with low rigidity. The workpiece W may have a different shape, so long as the rigidity of the workpiece W is low. For example, the workpiece W may be a thin-wall cylinder.

The machining unit 4 machines the workpiece W retained by the workpiece retaining tool 3 by driving a working tool 4a. In the present embodiment, the machining unit 4 is configured to cut a side surface of the workpiece W retained by the workpiece retaining tool 3 by causing the columnar rotating cutting tool 4a with cutting edges formed on its peripheral surface to rotate about a central axis 4c. A driver 4d of the machining unit 4 includes, for example, a servomotor therein, and drives the rotating cutting tool 4a to rotate about the central axis 4c of a main shaft 4b (i.e., the central axis of the rotating cutting tool 4a).

The machining control device 5 performs control of moving the machining unit 4 relative to the workpiece retaining tool 3 to position the working tool 4a at a machining position. Specifically, the machining control device 5 includes: a moving mechanism (not shown) that moves the machining unit 4 relative to the workpiece retaining tool 3; and a controller (not shown) that controls the movement of the machining unit 4 relative to the workpiece retaining tool 3. In the present embodiment, the workpiece retaining tool 3 is fixed, and the machining unit 4 is moved by the moving mechanism. The controller performs computer numerical control (CNC) to control the position of the machining unit 4 by means of the moving mechanism and to control the operation of the machining unit 4, thereby controlling a cutting operation that the rotating cutting tool 4a performs on the workpiece W. The definition of machining position related data herein includes both data indicating the machining position and data correlated with the machining position.

Next, the configuration of the machining assistance system 1 is described with reference to FIG. 1. The machining assistance system 1 includes a workpiece supporting force generating unit 6, a supporting device 7, a dynamometer 9, and a workpiece supporting force control device 8.

The workpiece supporting force generating unit 6 generates workpiece supporting force against machining reaction force that is exerted on a machining portion of the workpiece W by the working tool 4a. In the present embodiment, the workpiece supporting force generating unit 6 includes a columnar rotary body 6a, a base 6b, and a rotation driver 6d. The columnar rotary body 6a is formed as an elastic body, for example. The elasticity of the elastic body is suitably selected by taking account of pushing force described below, the chattering frequency of the workpiece W, and so forth. In the present embodiment, the rotary body 6a is a rubber roller. The rotary body 6a includes a rotary shaft (not shown) whose central axis is an axis 6c. The rotary shaft is rotatably retained by the base 6b via bearings (not shown). The rotation driver 6d is mounted to the base 6b, and causes the rotary body 6a to rotate about the axis 6c in accordance with a rotational torque command from the workpiece supporting force control device 8. The rotation driver 6d is configured, for example, as a motor, and the main shaft of the motor is coaxially connected to the rotary shaft of the rotary body 6a. In the present embodiment, the motor is a servomotor, for example.

The machining reaction force herein means force that is exerted from the working tool to the workpiece at the time of machining. In the case of side surface cutting of the present embodiment, cutting resistance is exerted from the workpiece W to the working tool 4a. In this case, reaction force against the cutting resistance, the reaction force being exerted from the working tool 4a to the workpiece W, is the machining reaction force (cutting reaction force).

The supporting device 7 is not limited to a particular device, so long as the supporting device 7 moves the supporting force generating unit 6 while supporting the supporting force generating unit 6. In the present embodiment, the supporting device 7 is, for example, an articulated arm robot provided with a plurality of joint axes that are necessary for its operation. The articulated arm robot 7 retains the base 6b of the workpiece supporting force generating unit 6 by a hand 7a provided at the distal end of the arm.

The dynamometer 9 detects motive power exerted on the workpiece W. In the present embodiment, the dynamometer 9 is provided in such a manner as to support the base of the workpiece retaining tool 3 of the machining apparatus 2, and detects motive power (a load) exerted on the workpiece W. The dynamometer 9 outputs the detected motive power to the workpiece supporting force control device 8 as machining reaction force related data. The definition of machining reaction force related data includes both data of machining reaction force and data correlated with the machining reaction force. Since the motive power detected by the dynamometer 9 is the resultant force of machining reaction force exerted on the workpiece W and workpiece supporting force exerted on the workpiece W by the supporting force generating unit 6, the motive power detected by the dynamometer 9 is data correlated with the machining reaction force.

Based on the machining reaction force related data received from the dynamometer 9 and the machining position related data received from the machining control device 5, the workpiece supporting force control device 8 controls the operation of the workpiece supporting force generating unit 6 and the operation of the supporting device 7, such that the workpiece supporting force generating unit 6 exerts workpiece supporting force on the workpiece W against the machining reaction force. In the present embodiment, the workpiece supporting force control device 8 is configured to control the operation of the articulated arm robot 7 and control the operation of the workpiece supporting force generating unit 6. In addition, as described below, the workpiece supporting force control device 8 is configured to: control the orientation and the position of the workpiece supporting force generating unit 6, such that the rotary body 6a exerts pushing force on the workpiece W against cutting reaction force that is exerted on the workpiece W by the rotating cutting tool 4a; and control the operation of the rotation driver 6d, such that the rotary body 6a rotates and exerts a rotational torque on the workpiece W against a torque that is generated by the cutting reaction force.

Figure 2:
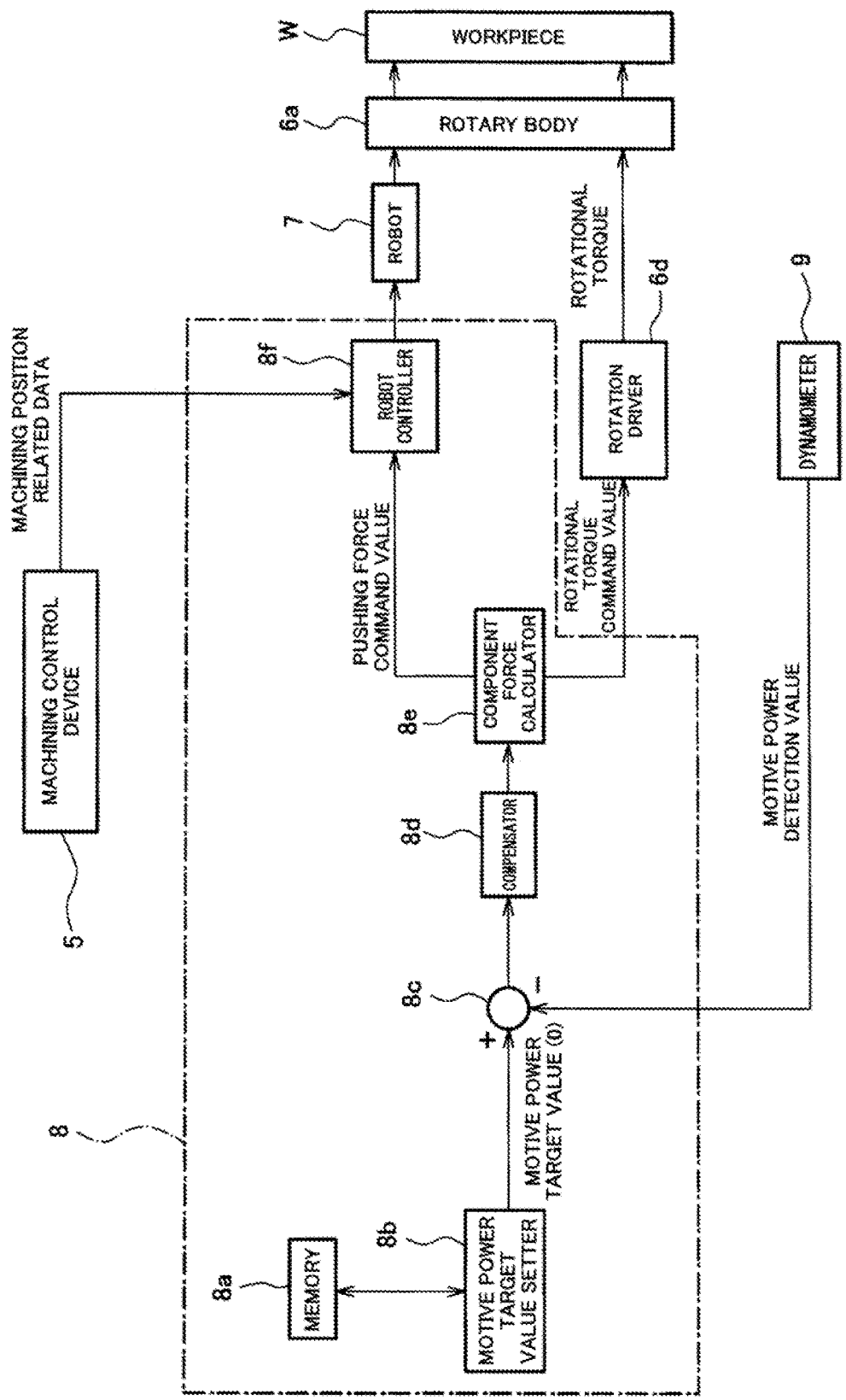
FIG. 2 is a block diagram showing the configuration of a workpiece supporting force control device in the machining assistance system of FIG. 1.

FIG. 2 is a block diagram showing the configuration of the workpiece supporting force control device (which may be hereinafter simply referred to as a supporting force control device) 8. As shown in FIG. 2, the workpiece supporting force control device 8 includes a memory 8a, a motive power target value setter 8b, an adder-subtracter 8c, a compensator 8d, a component force calculator 8e, and a robot controller 8f. The workpiece supporting force control device 8 is configured, for example, as an arithmetic operation device such as a microcontroller or the like. The memory 8a is configured, for example, as an internal memory of the microcontroller or the like. The aforementioned blocks 8b to 8e are functional blocks that are realized when the microcontroller executes a predetermined installed program.

The memory 8a stores various data, such as a target value of the motive power (hereinafter, referred to as a motive power target value).

The motive power target value setter 8b retrieves the motive power target value stored in the memory 8a, and outputs the retrieved motive power target value to the adder-subtracter 8c. In the present embodiment, the motive power target value is set to zero, and when the motive power detected by the dynamometer 9 (hereinafter, referred to as a motive power detection value) is zero, it means that proper supporting force is exerted on the workpiece W.

The adder-subtracter 8c outputs a deviation of the motive power target value from the motive power detection value (hereinafter, referred to as a motive power deviation), which is a value obtained by subtracting the motive power detection value from the motive power target value, to the compensator 8d.

The compensator 8d performs, for example, PID compensation on the motive power deviation, and outputs the compensated motive power deviation to the component force calculator 8e.

Based on the compensated motive power deviation, the component force calculator 8e calculates pushing force that the rotary body 6a exerts against cutting reaction force that is exerted on the workpiece W by the rotating cutting tool 4a, and calculates a rotational torque that the rotary body 6a exerts, by rotating, against a torque that is generated by the cutting reaction force. It should be noted that the cutting reaction force can be divided into: tangential-direction component force, which is exerted in the tangential direction of the rotating cutting tool 4a; perpendicular-direction component force, which is exerted perpendicularly to the tangential-direction component force; and axial-direction component force, which is exerted in the direction of the rotational axis 4c. The ratio among the tangential-direction component force, the perpendicular-direction component force, and the axial-direction component force can be estimated based on the manner of performing the cutting work, or can be detected by the dynamometer 9. Thus, the ratio is known. Based on the known ratio, the component force calculator 8e calculates the pushing force and the rotational torque. In addition, the component force calculator Se outputs a command value of the calculated pushing force to the robot controller 8f, and outputs a command value of the calculated rotational torque to the rotation driver 6d.

The robot controller 8f controls the operation of the articulated arm robot, which serves as the supporting device 7. In the present embodiment, based on the machining position related data obtained from the machining control device 5, the robot controller 8f outputs an operation control signal to the articulated arm robot 7, such that the supporting force generating unit 6 is positioned at a position corresponding to a machining position where the rotating cutting tool 4a performs machining. Specifically, for example, the robot controller 8f converts the machining position related data represented in a coordinate system of the machining apparatus 2 into data represented in a coordinate system of the articulated arm robot 7, and controls the operation of the articulated arm robot 7 by using the converted data, such that the axis 6c of the rotary body 6a is parallel to the rotational axis of the rotating cutting tool 4a, and such that the position of the rotary body 6a in the height direction and the position of the rotary body 6a in the feed direction of the rotating cutting tool 4a correspond to the machining position where the rotating cutting tool 4a performs machining. Accordingly, the rotary body 6a moves in a manner to follow the movement of the machining position where the rotating cutting tool 4a performs machining. In addition, based on the pushing force command value, which is obtained from the component force calculator 8e, the robot controller 8f outputs an operation control signal to the articulated arm robot 7 to exert pushing force on the workpiece W via the rotary body 6a of the supporting force generating unit 6. Specifically, in accordance with the pushing force command value, the robot controller 8f controls the operation of the articulated arm robot 7 to change the position of the rotary body 6a and the pushing force in the thickness direction of the workpiece W. In this manner, the pushing force based on the pushing force command value is exerted on the workpiece W by the rotary body 6a.

Meanwhile, the rotation driver 6d controls the rotary body 6a of the supporting force generating unit 6 to exert a rotational torque on the workpiece W based on the rotational torque command value obtained from the component force calculator 8e. Specifically, the rotation driver 6d causes the rotary body 6a to rotate in the same direction as the rotation direction of the rotating cutting tool 4a with a rotational torque corresponding to the rotational torque command value. In this manner, the rotational torque corresponding to the rotational torque command value is exerted on the workpiece W by the rotary body 6a.

Then, feedback control of the pushing force and the rotational torque that are exerted by the rotary body 6a is performed, such that the motive power detected by the dynamometer 9 is zero. As a result, workpiece supporting force that substantially matches the machining reaction force exerted on the workpiece W is exerted on the machining portion of the workpiece W, and thereby deformation of the workpiece due to the machining reaction force is prevented. It should be noted that, by suitably selecting the elasticity of the rotary body 6a, slight chattering vibration is absorbed by the rotary body 6a and thus suppressed.

Figure 3A:
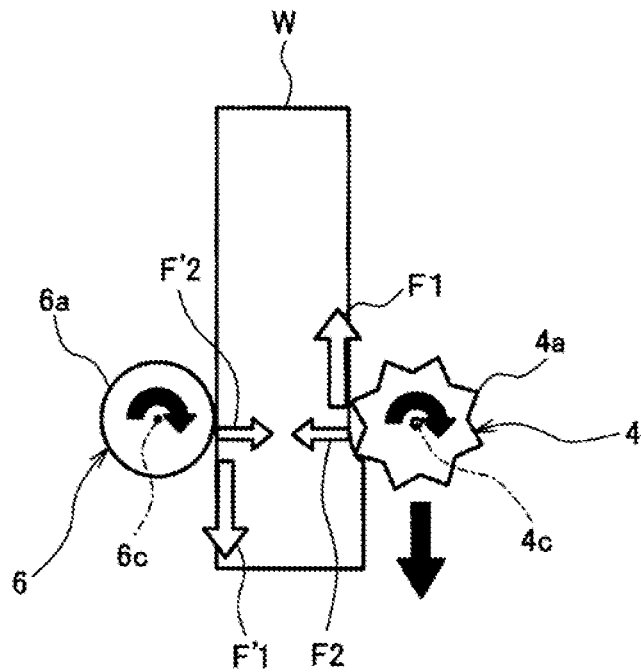
FIGS. 3A and 3B are schematic diagrams for describing workpiece supporting force exerted by the machining assistance system of FIG. 1 when side surface cutting is performed.
Figure 3B:
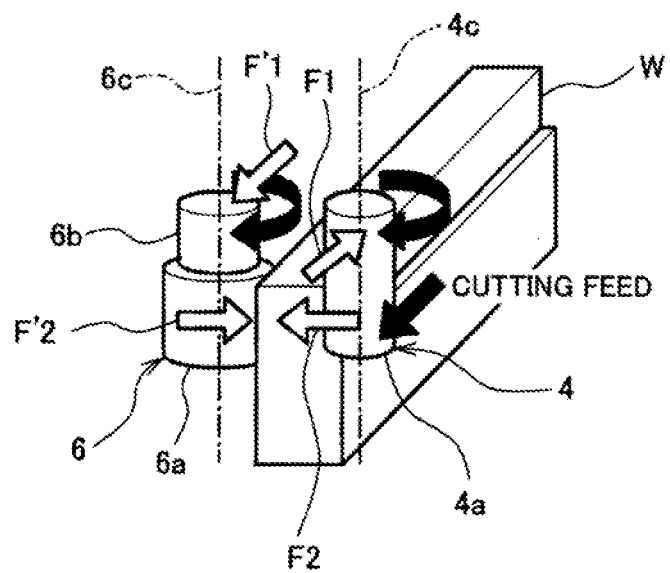

FIGS. 3A and 3B are schematic diagrams for describing workpiece supporting force (which may be hereinafter simply referred to as supporting force) exerted by the machining assistance system 1 when side surface cutting is performed. A plan view of FIG. 3A and a perspective view of FIG. 3B only show the rotating cutting tool 4a of the machining unit 4, the workpiece W, and the rotary body 6a of the supporting force generating unit 6 for the sake of convenience of the description. As shown in FIGS. 3A and 3B, in a case where the feed direction of the rotating cutting tool 4a is the direction toward the front side of the drawing, the workpiece supporting force control device 8 uses the supporting device (articulated arm robot) 7 to control the orientation and the position of the workpiece supporting force generating unit 6, such that: the axis 6c of the rotary body 6a is parallel to the central axis 4c of the rotating cutting tool 4a; the peripheral surface of the rotary body 6a faces the peripheral surface of the rotating cutting tool 4a with the workpiece W positioned in between; and the peripheral surface of the rotary body 6a exerts pushing force $F'_2$ on the workpiece W against perpendicular-direction component force $F_2$ of the cutting reaction force that is exerted on the workpiece W by the rotating cutting tool 4a. In addition, the workpiece supporting force control device 8 controls the operation of the rotation driver 6d to cause the rotary body 6a to rotate in a direction (indicated by a curved arrow in the drawing) that is the same as the rotation direction of the rotating cutting tool 4a, such that a rotational torque $F'_1$ is exerted on the workpiece W against a torque that is generated by tangential-direction component force $F_1$ of the cutting reaction force.

Therefore, in a case where the machining apparatus 2 is an apparatus for performing cutting of a side surface of the workpiece by means of the rotating cutting tool 4a as in Embodiment 1, the workpiece supporting force is controlled to substantially match the machining reaction force, and thereby deformation of the workpiece W due to the machining reaction force can be prevented even if the workpiece W is a low-rigidity workpiece. Consequently, a reduction in machining precision due deformation of the workpiece W can be prevented. Since it is not necessary to, for example, reduce the machining conditions, a reduction in production efficiency can be suppressed.

Embodiment 2

Next, Embodiment 2 of the present invention is described. In the description below, the same components as those described in Embodiment 1 are denoted by the same reference signs as those used in Embodiment 1, and the description of such common components is omitted. Hereinafter, a description is given focusing on differences from Embodiment 1.

Figure 4:
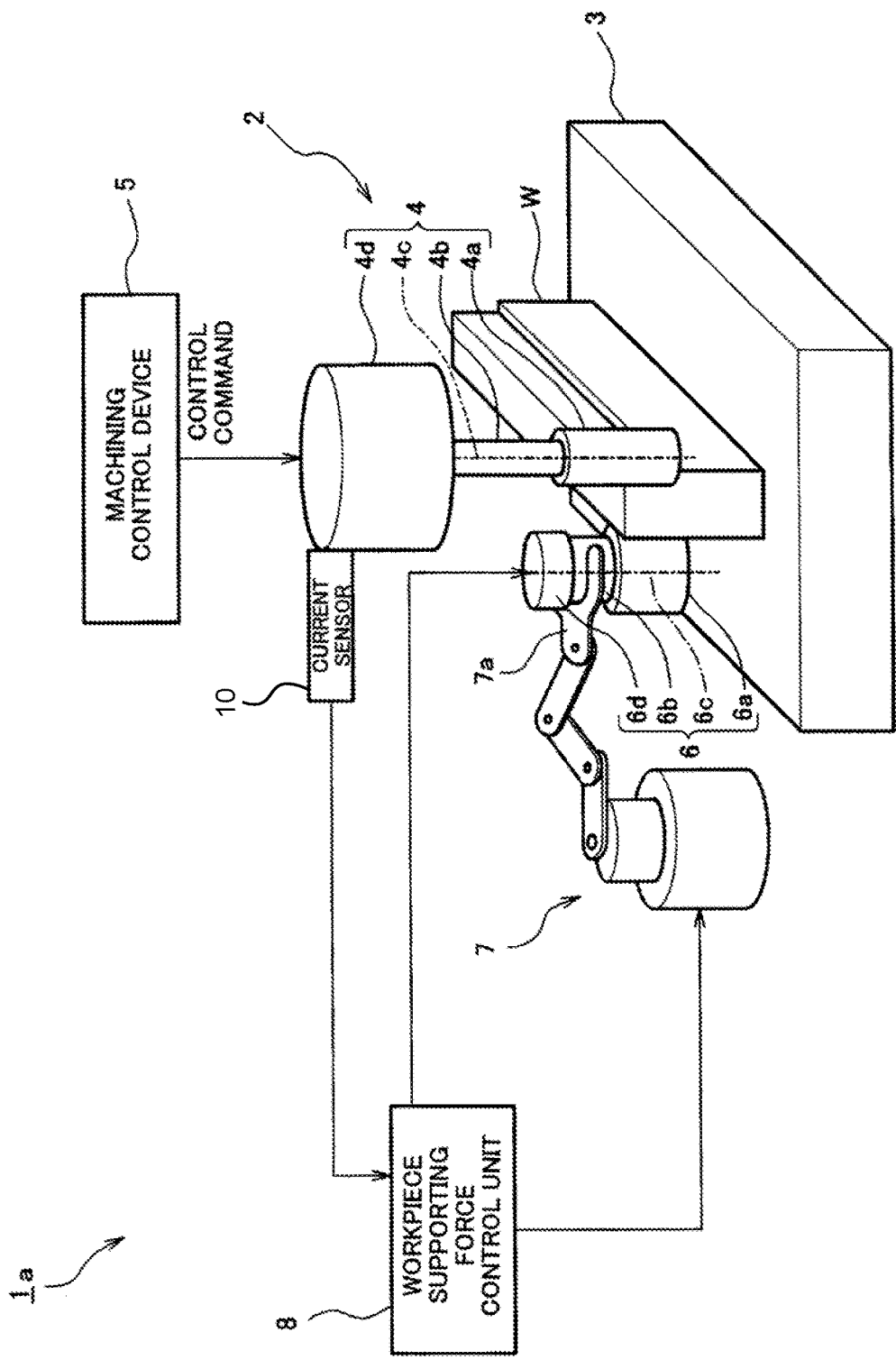
FIG. 4 is a block diagram showing the configuration of a machining assistance system according to Embodiment 2 of the present invention.

FIG. 4 is a block diagram showing the configuration of a machining assistance system according to Embodiment 2. As shown in FIG. 4, Embodiment 2 is different from Embodiment 1 in that a machining assistance system 1a according to Embodiment 2 further includes a current sensor 10, which detects an electric current flowing through the motor of the driver 4d of the machining unit 4, and the machining reaction force related data is a current value of the electric current flowing through the motor, which is detected by the current sensor 10. Here, the current value of the motor driving the rotating cutting tool 4a is a value corresponding to the machining reaction force.

Figure 5:
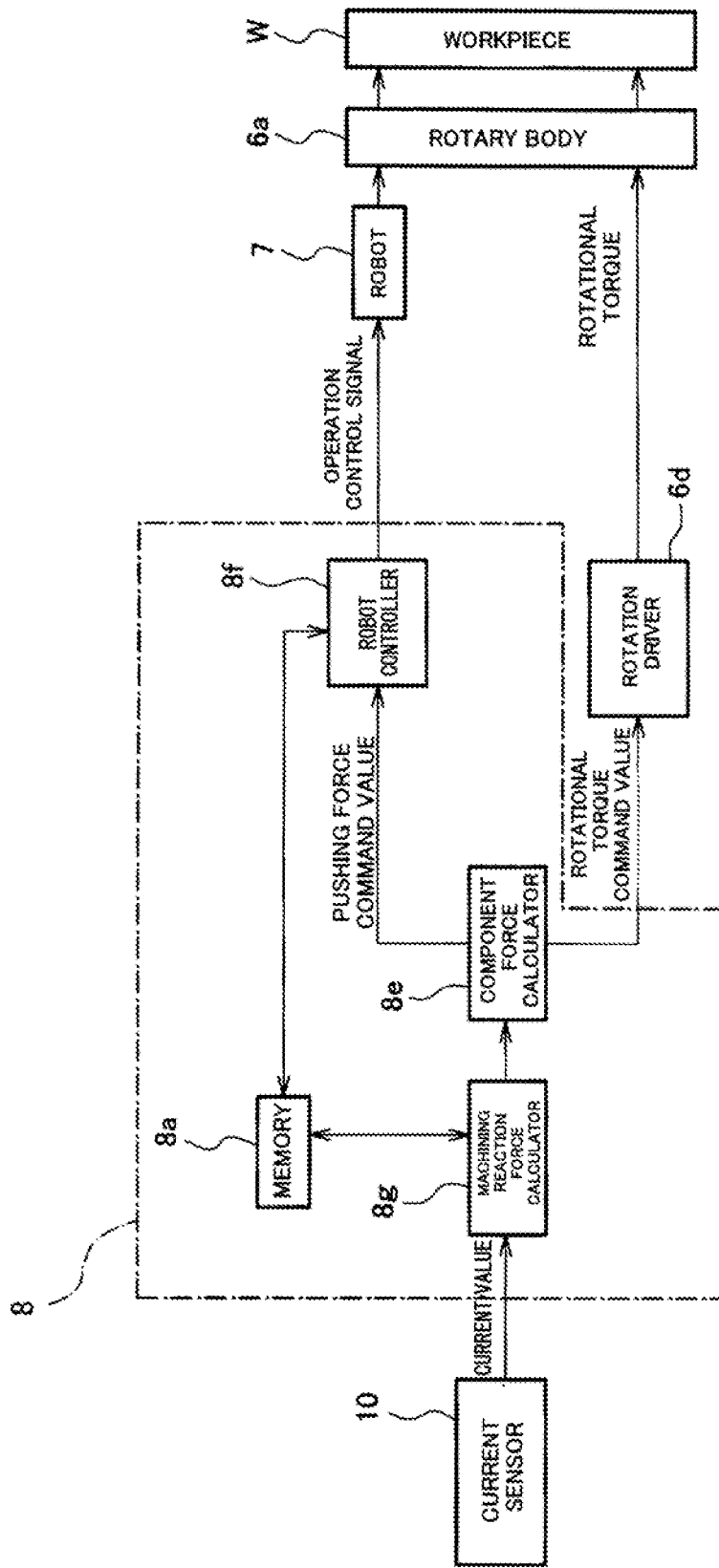
FIG. 5 is a block diagram showing the configuration of the workpiece supporting force control device in the machining assistance system of FIG. 4.

FIG. 5 is a block diagram showing the configuration of the workpiece supporting force control device 8 in the machining assistance system 1a of FIG. 4. As shown in FIG. 5, in the present embodiment, the workpiece supporting force control device 8 includes a machining reaction force calculator 8g. The memory 8a stores, as machining position related data, for example, data of the position of the rotary body 6a, which is taught in advance. The robot controller 8f retrieves the machining position related data taught in advance from the memory 8a, and based on the retrieved data, controls the operation of the articulated arm robot 7, such that the rotary body 6a moves in a manner to follow the movement of the machining position where the rotating cutting tool 4a performs machining.

In the memory 8a, for example, current values of the motor and machining reaction force corresponding to each of the current values are stored as a table in advance. The machining reaction force calculator 8g receives a current value from the current sensor 10 as machining reaction force related data, refers to the table, retrieves the machining reaction force that corresponds to the received current value from the memory 8a, and outputs the retrieved machining reaction force to the component force calculator 8e.

In this manner, feedforward control is performed, such that the pushing force and the rotational torque exerted by the rotary body 6a correspond to the current value of the motor of the machining unit 4. As a result, workpiece supporting force that substantially matches the machining reaction force exerted on the workpiece W is exerted on the machining portion of the workpiece W, and thereby deformation of the workpiece due to the machining reaction force is prevented.

As described above, according to Embodiment 2, the machining reaction force exerted on the workpiece W during the machining is indirectly detected in real time by the current sensor 10. This makes it possible to perform feedforward control of the workpiece supporting force by using the motor current value detected by the current sensor 10.

Embodiment 3

Next, Embodiment 3 of the present invention is described. In the description below, the same components as those described in Embodiment 1 are denoted by the same reference signs as those used in Embodiment 1, and the description of such common components is omitted. Hereinafter, a description is given focusing on differences from Embodiment 1.

Figure 6:
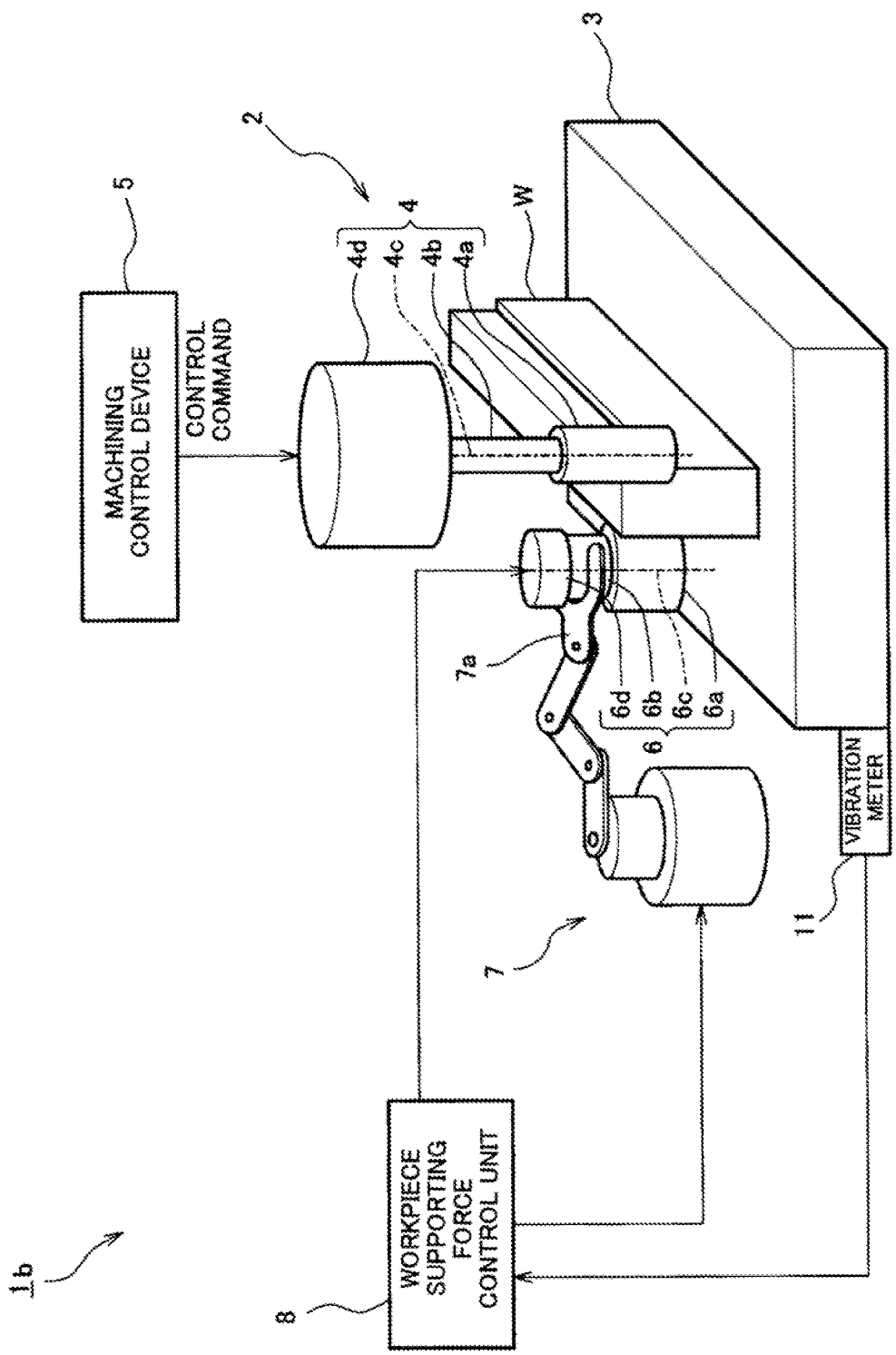
FIG. 6 is a block diagram showing the configuration of a machining assistance system according to Embodiment 3 of the present invention.

FIG. 6 is a block diagram showing the configuration of a machining assistance system according to Embodiment 3 of the present invention. As shown in FIG. 6, Embodiment 3 is different from Embodiment 1 in that a machining assistance system 1b according to Embodiment 3 includes a vibration meter 11 in place of the dynamometer 9 of Embodiment 1, the vibration meter 11 being provided on the base of the workpiece retaining tool 3 and measuring vibration of the workpiece W during machining, and the machining reaction force related data is the vibration measured by the vibration meter 11. Here, the vibration of the workpiece W corresponds to the machining reaction force exerted on the workpiece W.

Figure 7:
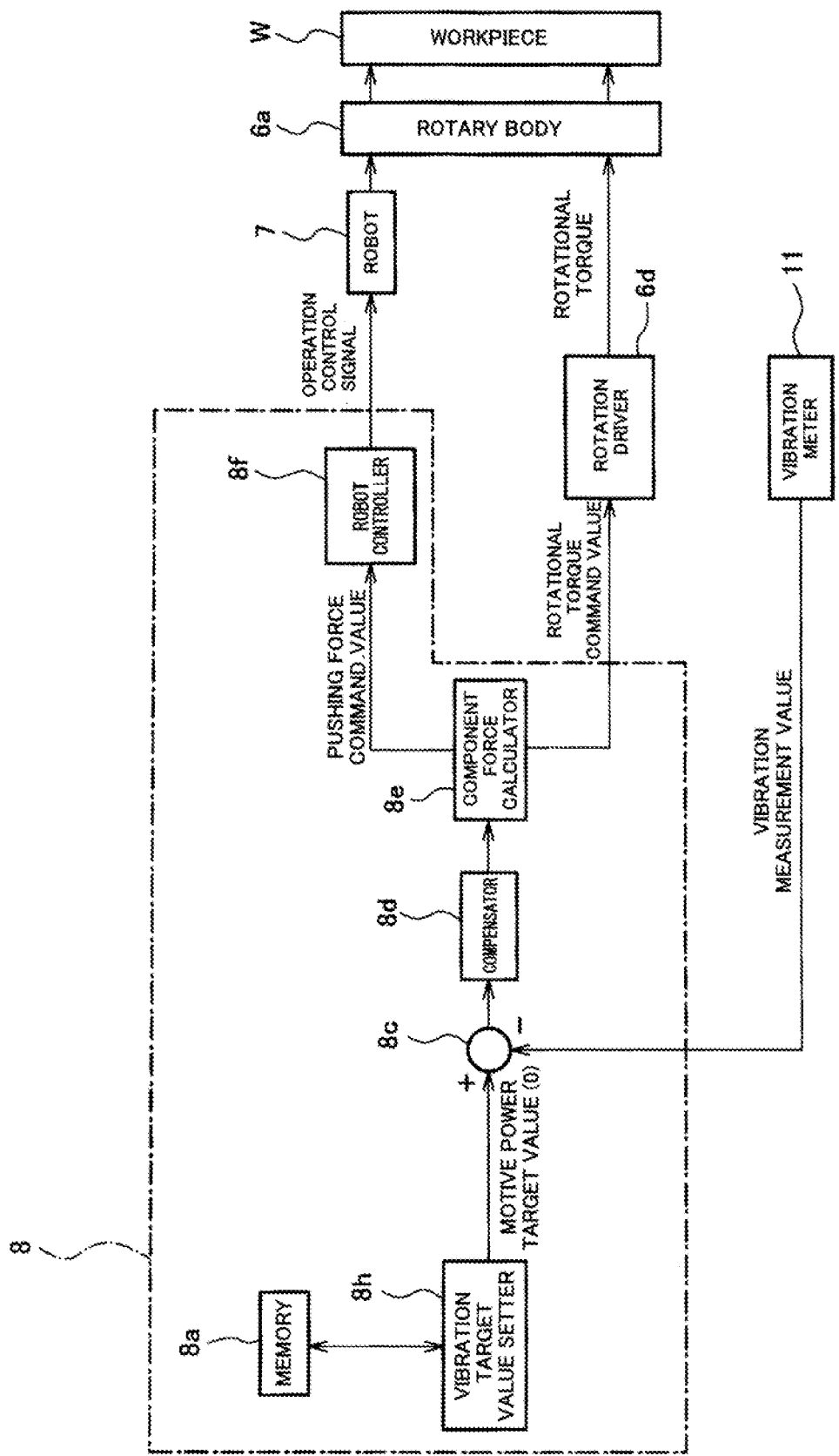
FIG. 7 is a block diagram showing the configuration of the workpiece supporting force control device in the machining assistance system of FIG. 6.

FIG. 7 is a block diagram showing the configuration of the workpiece supporting force control device in the machining assistance system 1b. As shown in FIG. 7, in the present embodiment, the workpiece supporting force control device 8 includes a vibration target value setter 8h. The vibration target value setter 8h retrieves a vibration target value stored in the memory 8a, and outputs the retrieved vibration target value to the adder-subtracter 8c. In the present embodiment, the vibration target value is set to zero, and when the vibration measured by the vibration meter 11 (hereinafter, referred to as a vibration measurement value) is zero, it means that proper supporting force is exerted on the workpiece W. The adder-subtracter 8c outputs a deviation of the vibration target value from the vibration measurement value (hereinafter, referred to as a vibration deviation), which is a value obtained by subtracting the vibration measurement value from the vibration target value, to the compensator 8d.

The compensator 8d performs, for example, PID compensation on the vibration deviation, and outputs the compensated vibration deviation to the component force calculator 8e.

Based on the compensated vibration deviation, the component force calculator 8e outputs a pushing force command value and a rotational torque command value. Since the operations thereafter are the same as those described in Embodiment 1, the description thereof is omitted.

As described above, according to Embodiment 3, the machining reaction force exerted on the workpiece W during the machining is indirectly measured in real time by the vibration meter 11. This makes it possible to perform feedback control of the workpiece supporting force by using the vibration measured by the vibration meter 11. Consequently, vibration of the workpiece W can be suppressed.

[Variation 1]

Figure 8:
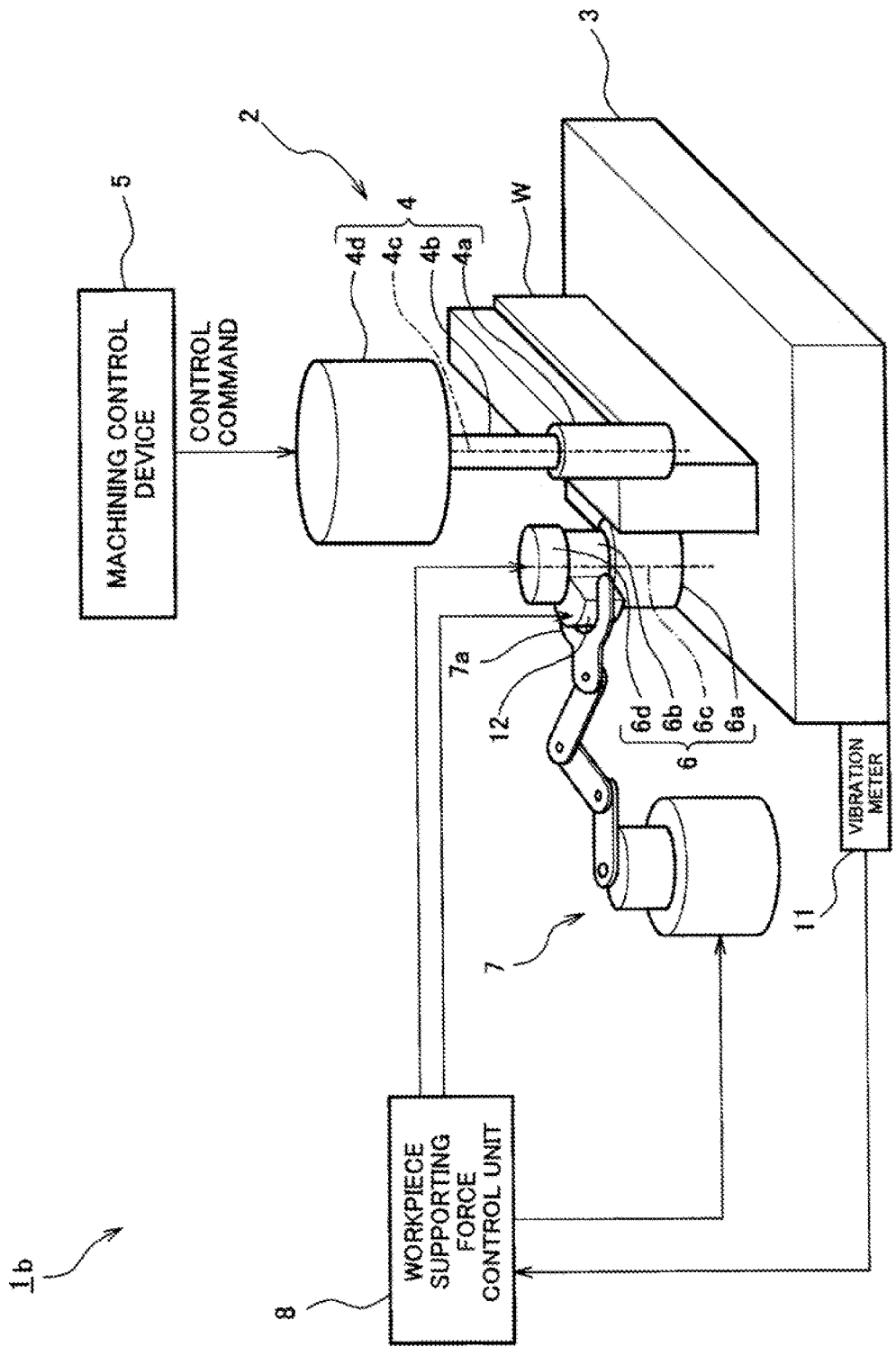
FIG. 8 is a block diagram showing the configuration of a machining assistance system according to Variation 1 of Embodiment 3 of the present invention.

FIG. 8 is a block diagram showing the configuration of a machining assistance system according to Variation 1 of Embodiment 3 of the present invention. As shown in FIG. 8, the base 6b of the rotation driver 6d is supported by an excitation device 12 for actively suppressing vibration. A known excitation device can be used as the excitation device 12. Since the structure of such an excitation device is well known, the description thereof is given below briefly. The excitation device 12 includes, for example, a movable body (not shown) elastically supported by a base (not shown) and an exciter (not shown) that causes the movable body to vibrate. The base 6b of the rotation driver 6d is retained by the movable body, and the base of the excitation device 12 is retained by the hand 7a of the articulated arm robot 7. The excitation device 12 is configured to apply predetermined vibration to the rotary body 6a based on a vibration command from the workpiece supporting force control unit 8. The excitation device 12 is, for example, an electromagnetic excitation device of a permanent magnet type.

Figure 9:
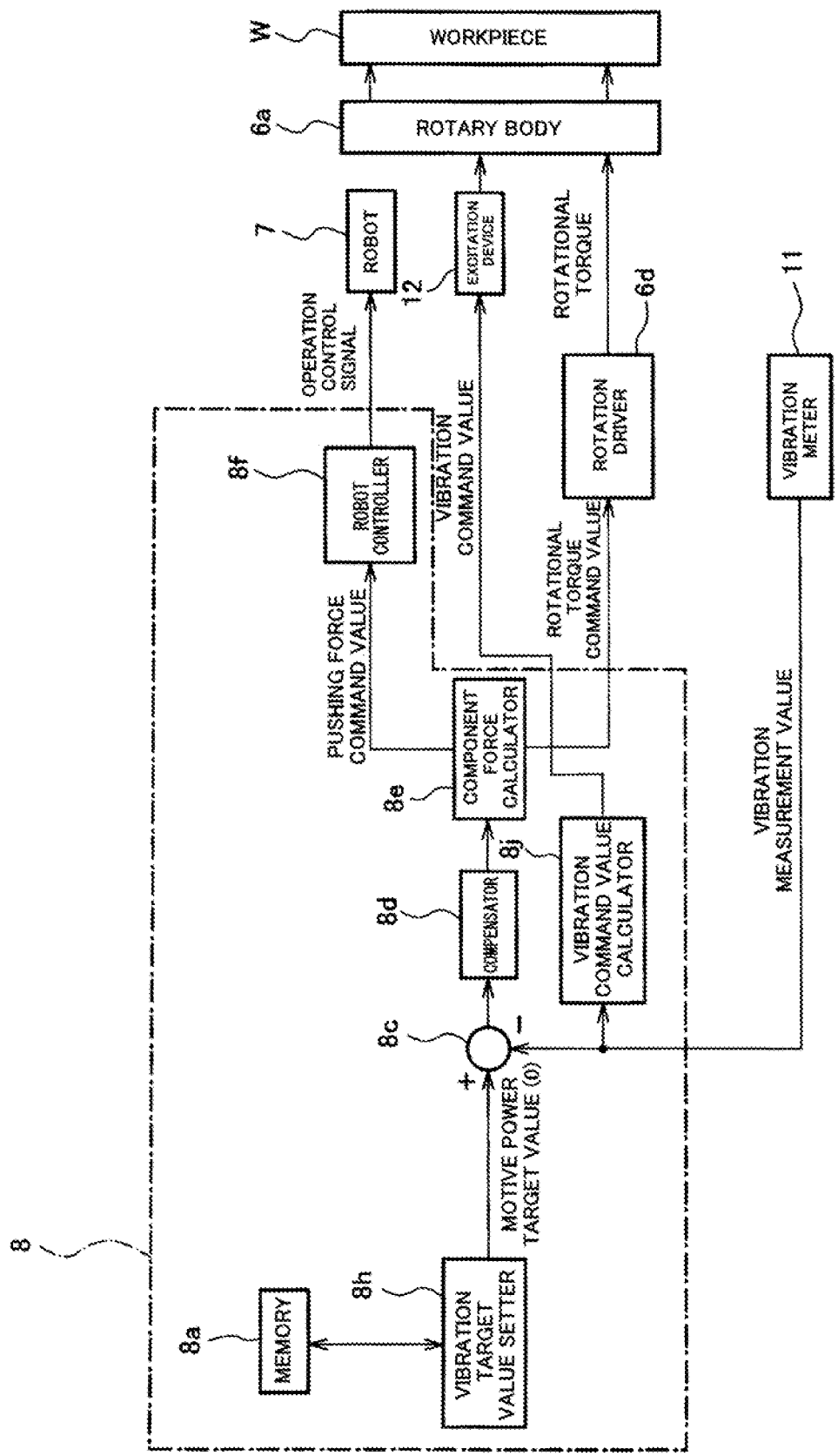
FIG. 9 is a block diagram showing the configuration of the workpiece supporting force control device in the machining assistance system of FIG. 8.

FIG. 9 is a block diagram showing the configuration of the workpiece supporting force control device in the machining assistance system of FIG. 8. As shown in FIG. 9, in Variation 1, the workpiece supporting force control device 8 further includes a vibration command value calculator 8j. The vibration command value calculator 8j calculates a vibration command value based on the vibration measurement value received from the vibration meter 11, and outputs the vibration command value to the excitation device 12. In the present embodiment, the vibration command value calculator 8j has, for example, a Fourier analysis function, and calculates the frequency and amplitude of major frequency components from the received vibration measurement value, and generates and outputs such a vibration command value as to cancel the major frequency components to the excitation device 12. In accordance with the vibration command value, the excitation device 12 actively generates vibration that cancels the vibration of the vibration measurement value. The generated vibration is superimposed on the pushing force via the rotary body 6a, and is transmitted to the workpiece W. This makes it possible to further increase the effect of suppressing the vibration of the workpiece W.

In general, the number of chattering vibrations occurring during machining differs at each machining position. Therefore, without using the excitation device 12, the strength of the pushing force exerted by the supporting force generating unit 6 may be changed for each machining position. Alternatively, the pushing force exerted by the supporting force generating unit 6 may be cyclically varied based on the natural frequency of the workpiece W. Further alternatively, the rotary body 6a may be provided with a dynamic vibration absorber, and the characteristics of the dynamic vibration absorber may be changed in accordance with the vibration.

Embodiment 4

Next, Embodiment 4 of the present invention is described. In the description below, the same components as those described in Embodiment 1 are denoted by the same reference signs as those used in Embodiment 1, and the description of such common components is omitted. Hereinafter, a description is given focusing on differences from Embodiment 1.

Figure 10:
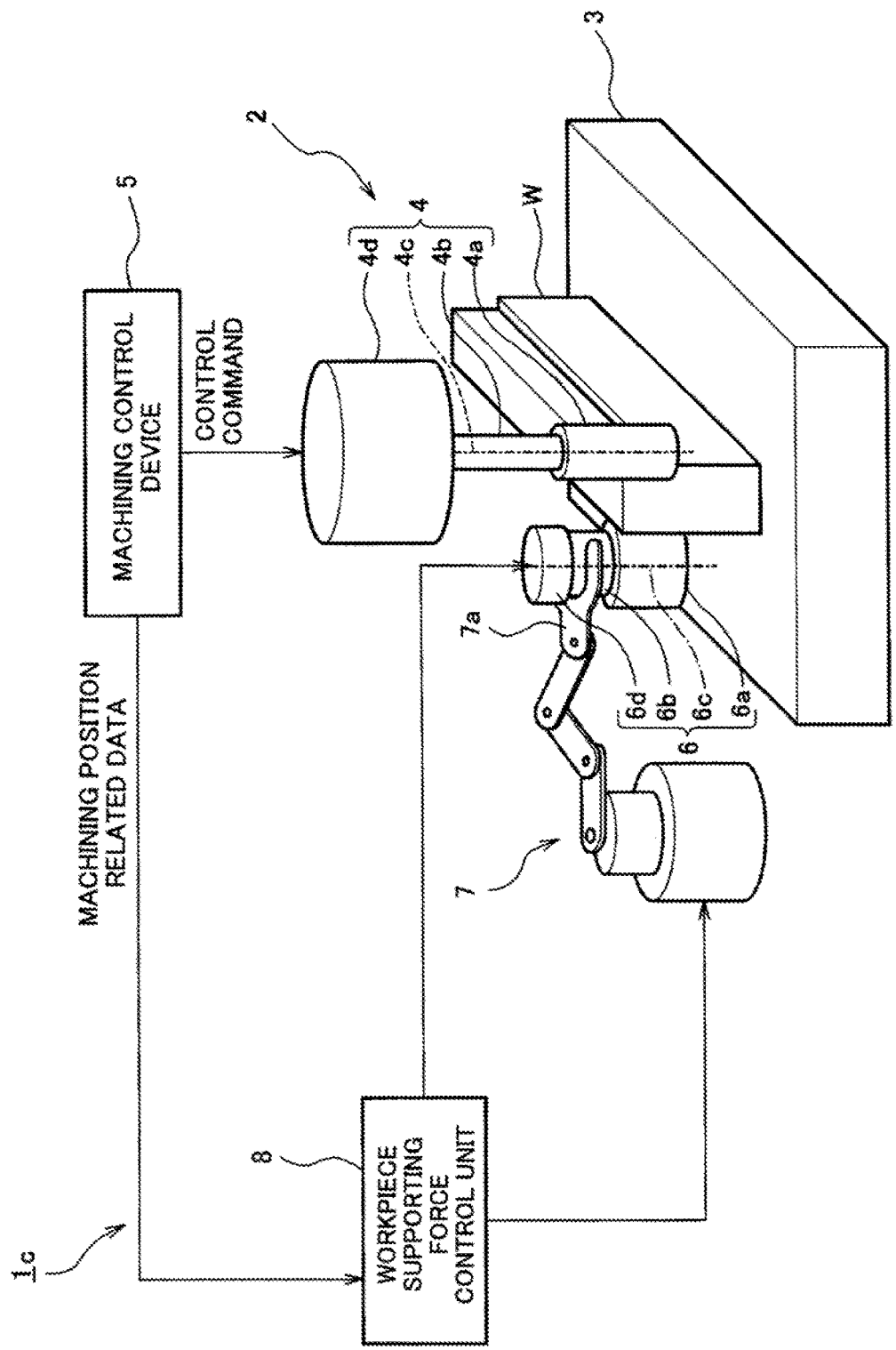
FIG. 10 is a block diagram showing the configuration of a machining assistance system according to Embodiment 4 of the present invention.

FIG. 10 is a block diagram showing the configuration of a machining assistance system 1c according to Embodiment 4. As shown in FIG. 10, the configuration according to Embodiment 4 is different from the above-described configurations according to Embodiments 1 to 3 in that the machining assistance system 1c according to Embodiment 4 does not include devices for detecting the machining reaction force, such as the dynamometer 9, the current sensor 10, and the vibration meter 11. In addition, the workpiece supporting force control device 8 according to Embodiment 4 is different from the workpiece supporting force control device 8 according to Embodiment 1 in that the workpiece supporting force control device 8 according to Embodiment 4 includes a memory therein for storing machining reaction force related data in advance, and controls the operation of the workpiece supporting force generating unit 6 and the operation of the supporting device 7 based on machining position related data received from the machining control device 2 and the internally-stored machining reaction force related data.

Figure 11:
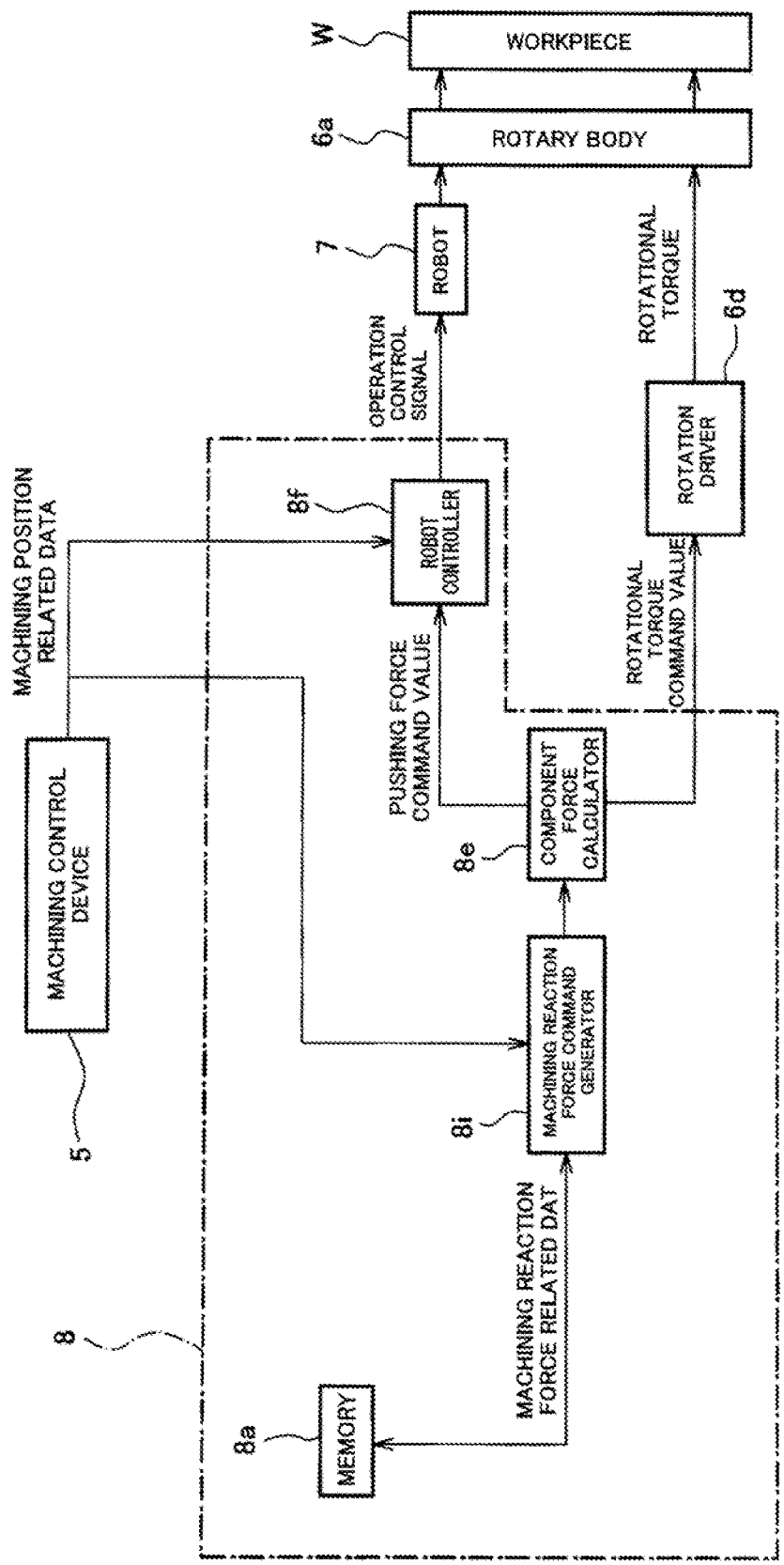
FIG. 11 is a block diagram showing the configuration of the workpiece supporting force control device in the machining assistance system of FIG. 10.

FIG. 11 is a block diagram showing the configuration of the workpiece supporting force control device 8 of FIG. 10. As shown in FIG. 11, in the present embodiment, the workpiece supporting force control device 8 includes: the memory 8a, in which machining reaction force related data is stored in advance; and a machining reaction force command generator 8i. Based on machining position related data received from the machining control device 5, the machining reaction force command generator 8i retrieves machining reaction force related data corresponding to each of machining positions from the memory 8a, and outputs the retrieved machining reaction force for each machining position to the component force calculator 8e. Here, the memory 8a stores the machining reaction force for each machining position, and the stored machining reaction force is experimentally or theoretically estimated in advance.

As described above, according to Embodiment 4, the machining reaction force for each machining position is experimentally or theoretically estimated in advance, and the workpiece supporting force can be controlled based thereon. This makes it possible to eliminate the devices for detecting the machining reaction force and simplify the machining assistance system. For example, in the case of experimentally estimating machining reaction force for cutting work, cutting resistance may be measured by a dynamometer in advance, and cutting reaction force estimated based on experimental data may be stored in the memory 8a.

[Variation 2]

Figure 12:
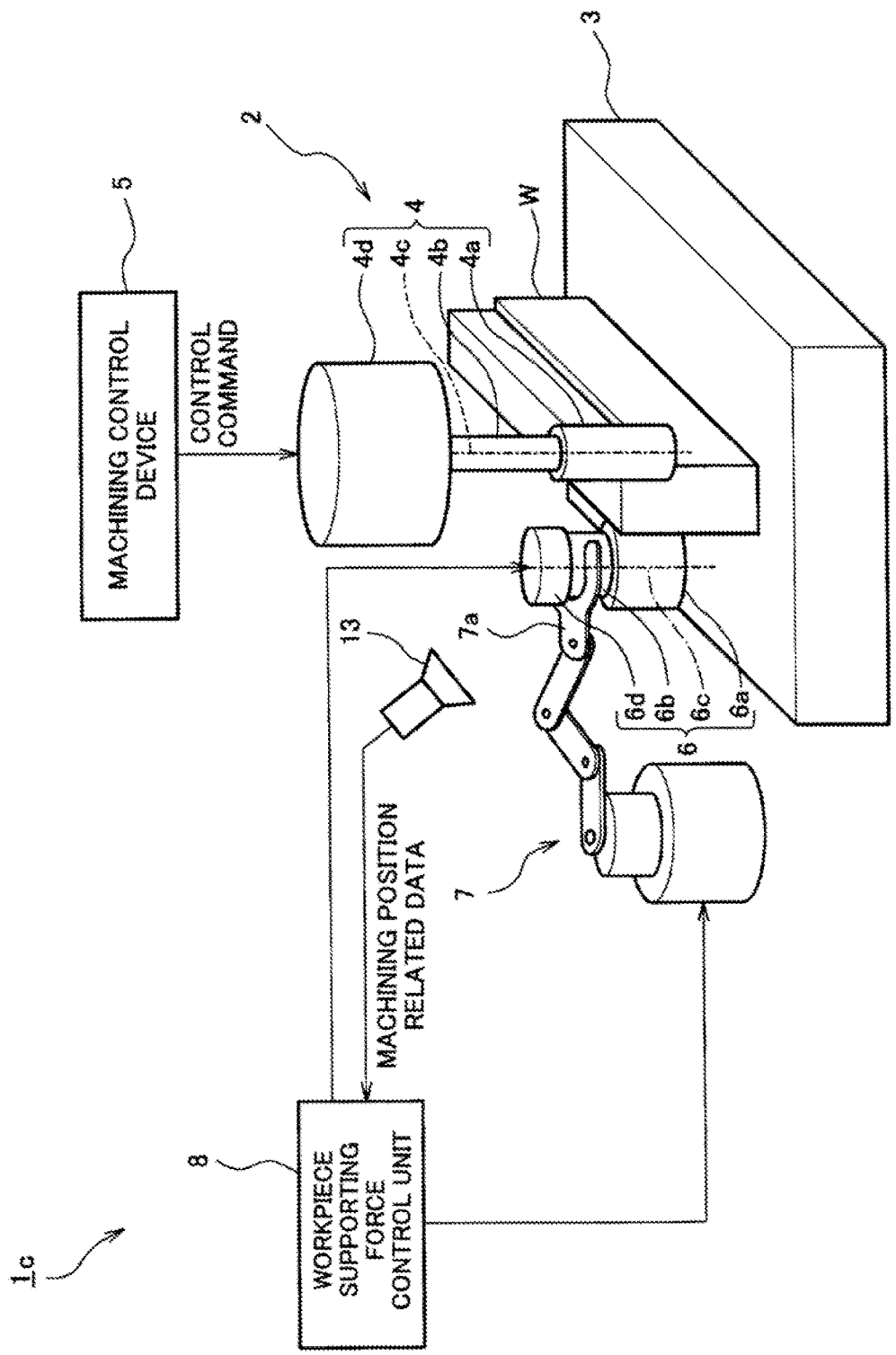
FIG. 12 is a block diagram showing the configuration of a machining assistance system according to Variation 2 of Embodiment 4 of the present invention.

FIG. 12 is a block diagram showing the configuration of a machining assistance system according to Variation 2 of Embodiment 4 of the present invention. As shown in FIG. 12, the machining assistance system obtains machining position related data by a vision sensor 13 provided in the vicinity of the articulated arm of the robot 7.

Figure 13:
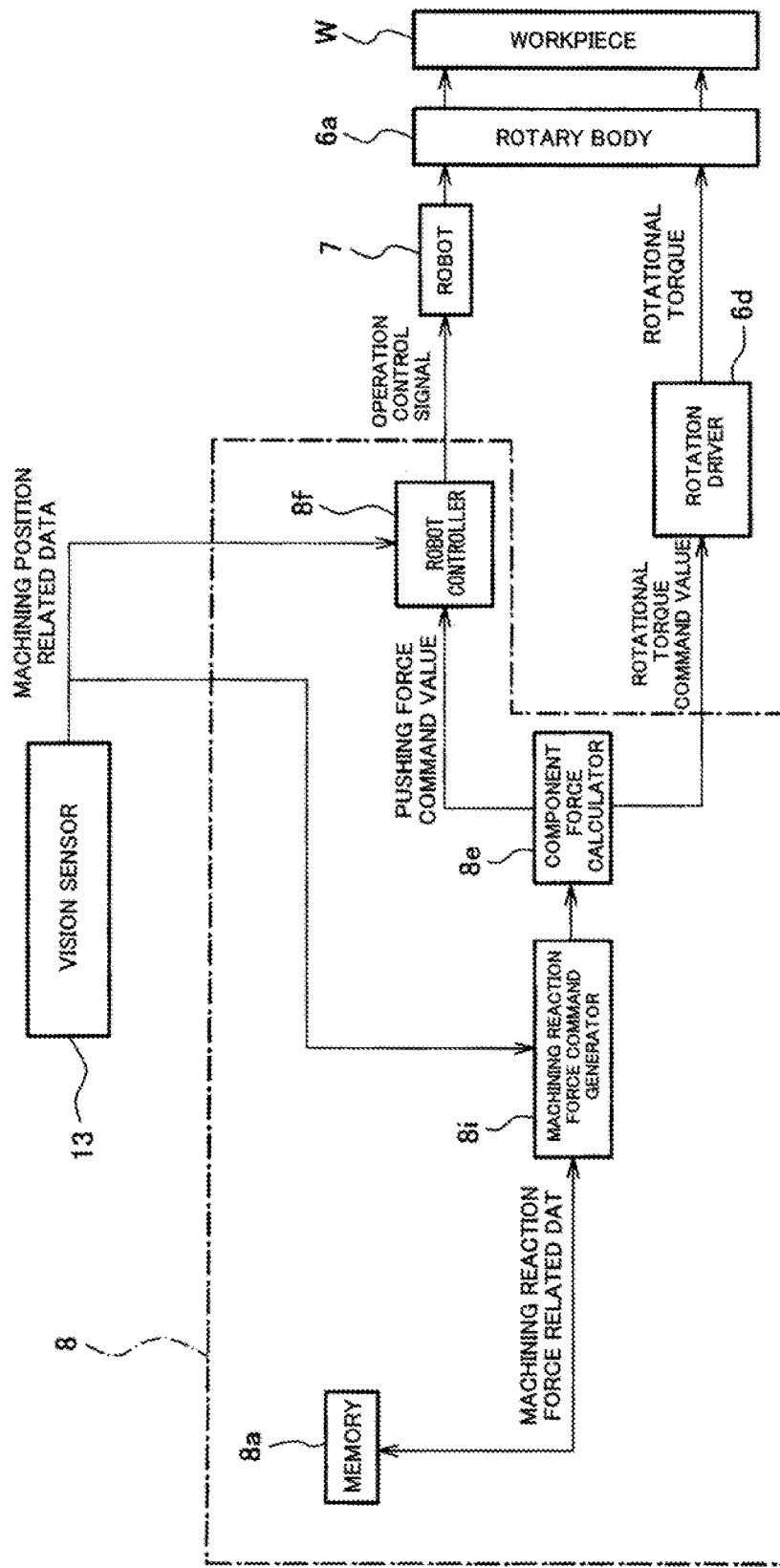
FIG. 13 is a block diagram showing the configuration of the workpiece supporting force control device in the machining assistance system of FIG. 12.

FIG. 13 is a block diagram showing the configuration of the workpiece supporting force control device in the machining assistance system of FIG. 12. As shown in FIG. 13, in Variation 2, the workpiece supporting force control device 8 includes: the memory 8a, in which machining reaction force related data is stored in advance; and the machining reaction force command generator 8i. Based on the machining position related data received from the vision sensor 13, the machining reaction force command generator 8i retrieves machining reaction force related data corresponding to each of machining positions from the memory 8a, and outputs the retrieved machining reaction force for each machining position to the component force calculator 8e.

Embodiment 5

Next, Embodiment 5 of the present invention is described. In the description below, the same components as those described in Embodiment 1 are denoted by the same reference signs as those used in Embodiment 1, and the description of such common components is omitted. Hereinafter, a description is given focusing on differences from Embodiment 1.

Figure 14A:
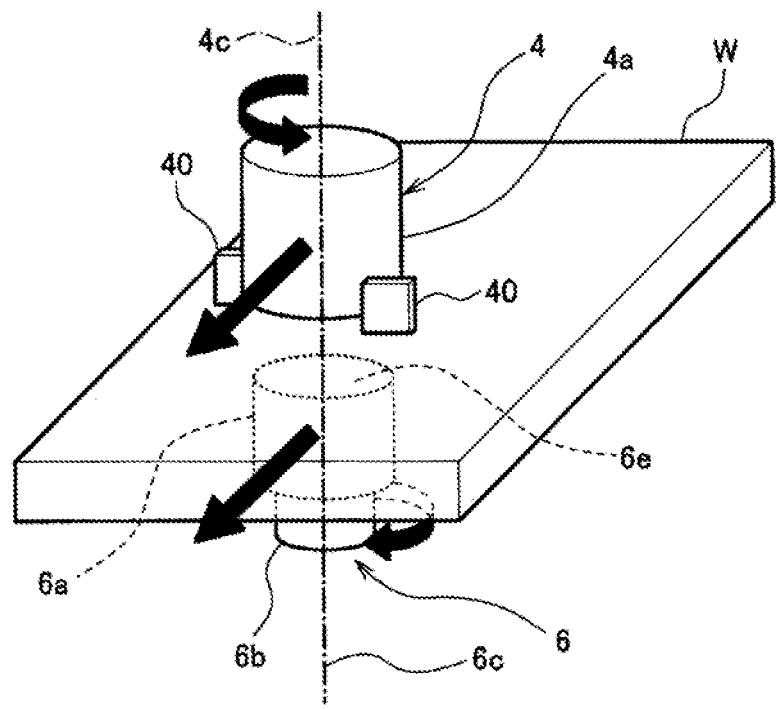
FIGS. 14A and 14B are schematic diagrams for describing workpiece supporting force exerted by a machining assistance system according to Embodiment 5 of the present invention when milling is performed.
Figure 14B:
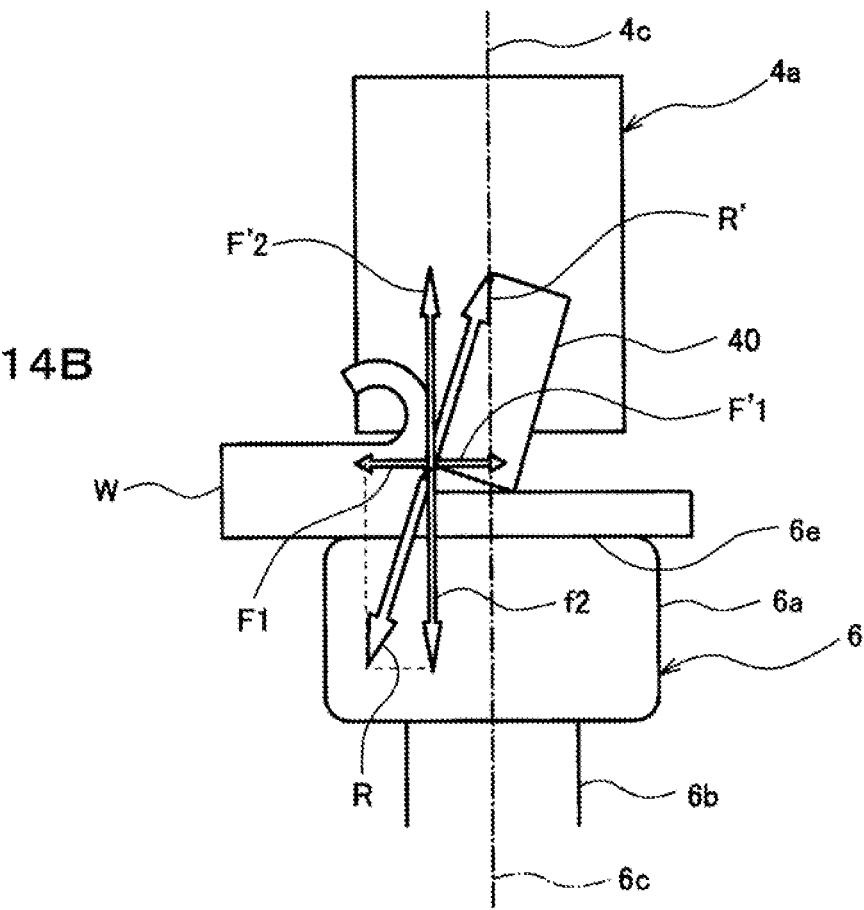

FIGS. 14A and 14B are schematic diagrams for describing workpiece supporting force exerted by a machining assistance system according to Embodiment 5 of the present invention when milling is performed. A perspective view of FIG. 14A and a side view of FIG. 14B only show the machining unit 4, the workpiece W, and the supporting force generating unit 6 for the sake of convenience of the description.

As shown in FIGS. 14A and 14B, the machining unit 4 of the machining assistance system according to Embodiment 5 is configured to perform cutting (milling) of a surface of the workpiece W retained by the workpiece retaining tool 3 (not shown) by causing the columnar rotating cutting tool 4a with cutting edges 40 formed on its distal end surface to rotate about the central axis 4c.

The workpiece supporting force generating unit 6 includes: the columnar rotary body 6a; and the rotation driver 6d (not shown), which causes the rotary body 6a to rotate about the axis 6c.

In Embodiment 5, in a case where the cutting feed direction of the rotating cutting tool 4a is the direction toward the front side of the drawing, the workpiece supporting force control device 8 is configured to use the supporting device 7 based on machining reaction force related data and machining position related data to control the orientation and the position of the workpiece supporting force generating unit 6, such that: the central axis 6c of the rotary body 6a is parallel to the central axis 4c of the rotating cutting tool 4a; the distal end surface of the rotary body 6a faces the distal end surface of the rotating cutting tool 4a with the workpiece W positioned in between; and the distal end surface of the rotary body 6a exerts pushing force $F'_2$ on the workpiece W against perpendicular-direction component force $F_2$ of cutting reaction force R that is exerted on the workpiece W by the rotating cutting tool 4a. In addition, the workpiece supporting force control device 8 is configured to control the operation of the rotation driver 6d to cause the rotary body 6a to rotate in a direction reverse to the rotation direction of the rotating cutting tool 4a, such that a rotational torque $F'_1$ is exerted on the workpiece W against a torque that is generated by tangential-direction component force $F_1$ of the grinding reaction force R. In the present embodiment, control is performed such that the axis 6c of the rotary body 6a is positioned coaxially with the central axis 4c of the rotating cutting tool 4a.

Therefore, in the case where the machining apparatus is an apparatus for performing milling of a surface of the workpiece by means of the rotating cutting tool 4a as in Embodiment 5, even if the workpiece W is a low-rigidity workpiece, a reduction in machining precision due to deformation of the workpiece W can be prevented while suppressing a reduction in production efficiency.

Embodiment 6

Next, Embodiment 6 of the present invention is described. In the description below, the same components as those described in Embodiment 5 are denoted by the same reference signs as those used in Embodiment 5, and the description of such common components is omitted. Hereinafter, a description is given focusing on differences from Embodiment 5.

Figure 15A:
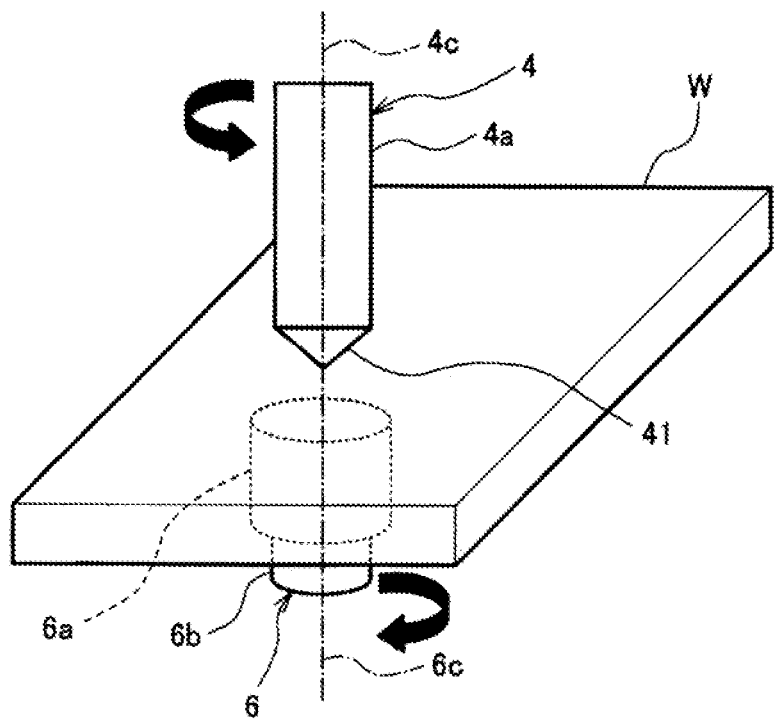
FIGS. 15A and 15B are schematic diagrams for describing workpiece supporting force exerted by a machining assistance system according to Embodiment 6 of the present invention when hole machining is performed.
Figure 15B:
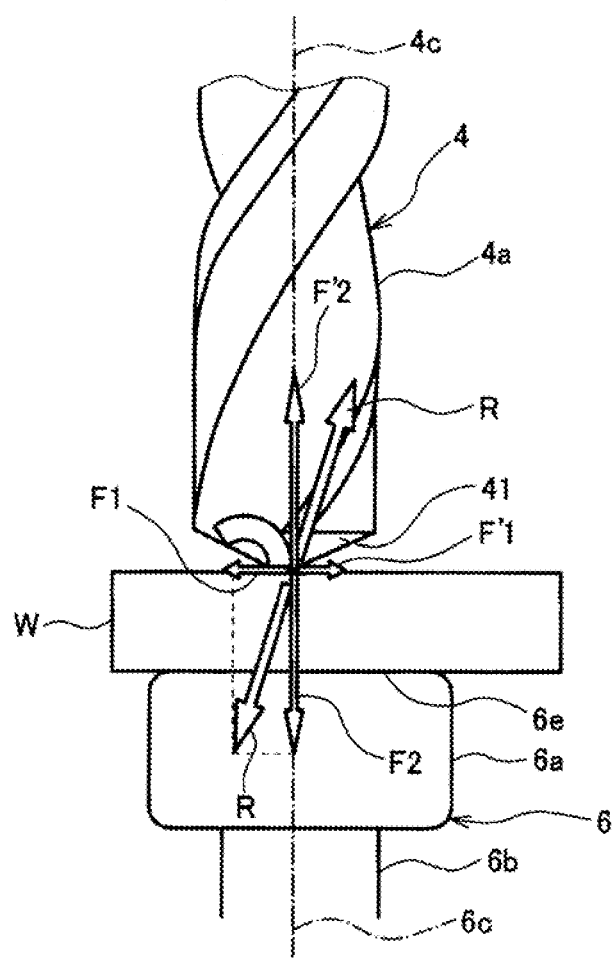

FIGS. 15A and 15B are schematic diagrams for describing workpiece supporting force exerted by a machining assistance system according to Embodiment 6 when hole machining is performed. A perspective view of FIG. 15A and a side view of FIG. 15B only show the machining unit 4, the workpiece W, and the supporting force generating unit 6 for the sake of convenience of the description. As shown in FIGS. 15A and 15B, the machining unit 4 of the machining assistance system according to Embodiment 6 is configured to perform cutting (drilling) of a surface of the workpiece W retained by the workpiece retaining tool 3 (not shown) by causing the columnar rotating cutting tool 4a with a drill bit 41 formed on its distal end to rotate about the central axis 4c.

Similar to Embodiment 5, the workpiece supporting force generating unit 6 includes: the columnar rotary body 6a; and the rotation driver 6d (not shown), which causes the rotary body 6a to rotate about the axis 6c.

In Embodiment 6, the workpiece supporting force control device 8 is configured to, based on machining reaction force related data and machining position related data and by using the supporting device 7, control the orientation and the position of the workpiece supporting force generating unit 6, such that: the central axis 6c of the rotary body 6a is parallel to the central axis 4c of the rotating cutting tool 4a; the distal end surface of the rotary body 6a faces the drill bit surface of the drill bit 41 provided at the distal end of the rotating cutting tool 4a with the workpiece W positioned in between; and the distal end surface of the rotary body 6a exerts pushing force $F'_2$ on the workpiece W against perpendicular-direction component force $F_2$ of cutting reaction force R that is exerted on the workpiece W by the rotating cutting tool 4a. In addition, the workpiece supporting force control device 8 is configured to control the operation of the rotation driver 6d to cause the rotary body 6a to rotate in a direction reverse to the rotation direction of the rotating cutting tool 4a, such that a rotational torque $F'_1$ is exerted on the workpiece W against a torque that is generated by tangential-direction component force $F_1$ of the cutting reaction force R. Also in the present embodiment, control is performed such that the central axis 6c of the rotary body 6a is positioned coaxially with the central axis 4c of the rotating cutting tool 4a.

Therefore, in the case where the machining apparatus is an apparatus for performing drilling of a surface of the workpiece by means of the rotating cutting tool 4a as in Embodiment 6, even if the workpiece W is a low-rigidity workpiece, a reduction in machining precision due to deformation of the workpiece can be prevented while suppressing a reduction in production efficiency.

Embodiment 7

Next, Embodiment 7 of the present invention is described. In the description below, the same components as those described in Embodiment 1 are denoted by the same reference signs as those used in Embodiment 1, and the description of such common components is omitted. Hereinafter, a description is given focusing on differences from Embodiment 1.

Figure 16:
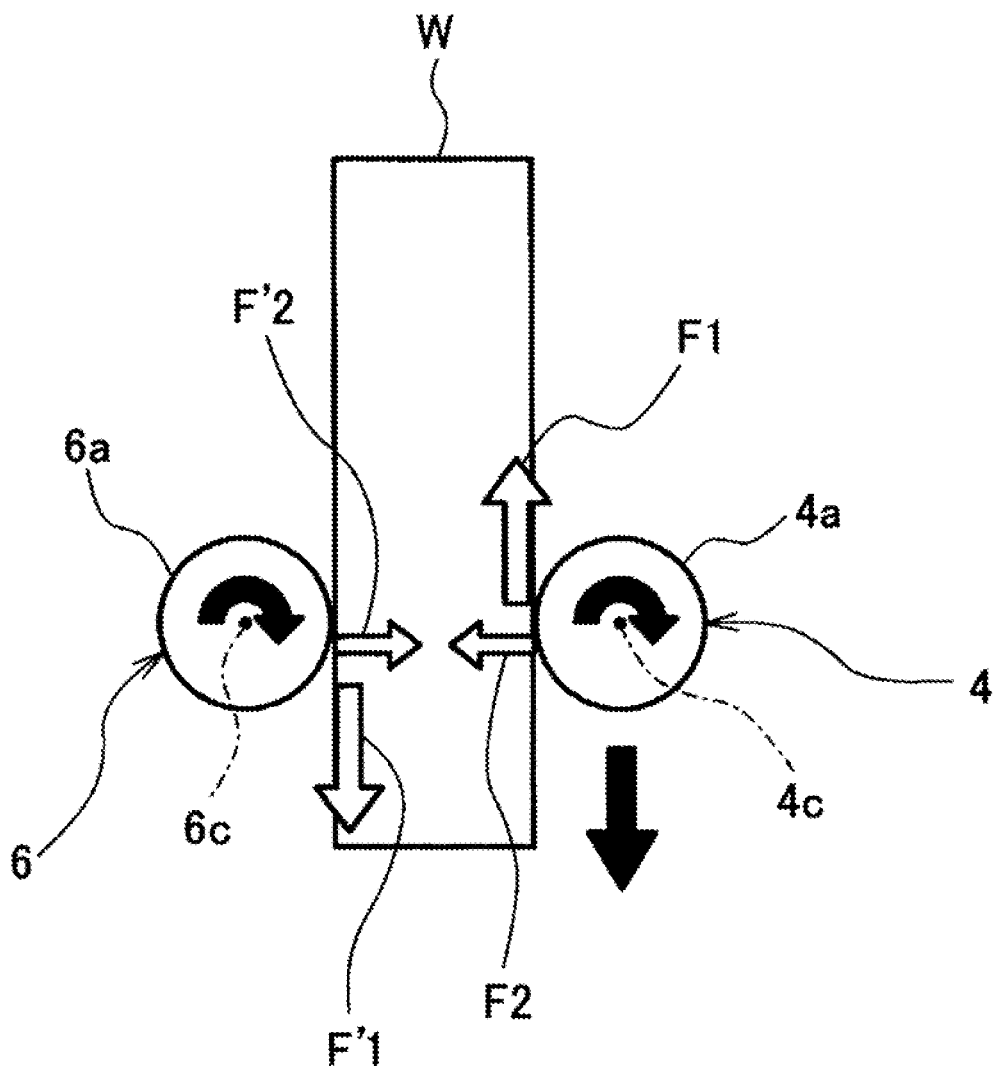
FIG. 16 is a schematic diagram for describing workpiece supporting force exerted by a machining assistance system according to Embodiment 7 when grinding is performed.

FIG. 16 is a schematic diagram for describing workpiece supporting force exerted by a machining assistance system according to Embodiment 7 when grinding is performed. A plan view of FIG. 16 only shows the machining unit 4, the workpiece W, and the supporting force generating unit 6 for the sake of convenience of the description. As shown in FIG. 16, the machining unit 4 is configured to perform grinding of a side surface of the workpiece W retained by the workpiece retaining tool 3 (not shown) by causing a discoid rotating grinding tool 4a with grinding stone formed on its peripheral surface to rotate about the central axis 4c.

The workpiece supporting force generating unit 6 includes: the columnar rotary body 6a; and the rotation driver 6d (not shown), which causes the rotary body 6a to rotate about the axis 6c.

In a case where the grinding feed direction of the rotating cutting tool 4a is the direction toward the front side of the drawing, the workpiece supporting force control device 8 is configured to control the orientation and the position of the workpiece supporting force generating unit 6 by using the supporting device 7, such that: the axis 6c of the rotary body 6a is parallel to the central axis 4c of the rotating grinding tool 4a; and the rotary body 6a exerts pushing force $F'_2$ on the workpiece W against perpendicular-direction component force $F_2$ of grinding reaction force that is exerted on the workpiece W by the rotating grinding tool 4a. In addition, the workpiece supporting force control device 8 is configured to control the operation of the rotation driver 6d to cause the rotary body 6a to rotate in the same direction as the rotation direction of the rotating grinding stone 4a, such that a rotational torque $F'_1$ is exerted on the workpiece W against a torque that is generated by tangential-direction component force $F_1$ of the grinding reaction force.

Therefore, in a case where the machining apparatus 2 is an apparatus for performing grinding of a side surface of the workpiece W by means of the rotating grinding stone 4a as in Embodiment 7, even if the workpiece W is a low-rigidity workpiece, a reduction in machining precision due to deformation of the workpiece W can be prevented while suppressing a reduction in production efficiency.

Embodiment 8

Figure 17A:
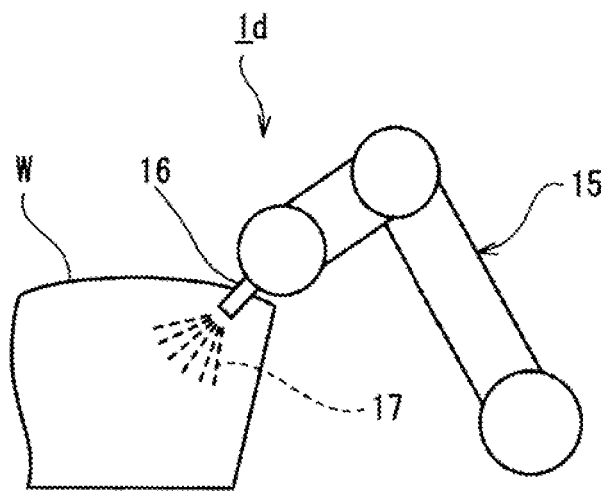
FIGS. 17A and 17B are schematic diagrams for describing one example of pre-machining treatment performed by a machining assistance system according to Embodiment 8.
Figure 17B:
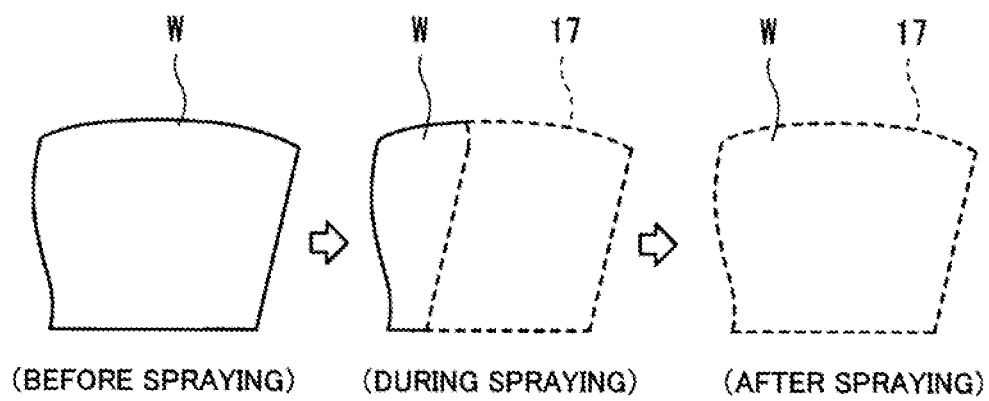

Next, Embodiment 8 of the present invention is described. In the description below, the same components as those described in Embodiments 1 to 7 are denoted by the same reference signs as those used in Embodiments 1 to 7, and the description of such common components is omitted. Hereinafter, a description is given focusing on differences from Embodiments 1 to 7. In Embodiments 1 to 7, the low-rigidity workpiece W, e.g., a thin plate-shaped workpiece or a thin-wall cylindrical workpiece, is a machining target object. However, in the present embodiment, a machining portion of a surface of the workpiece W is coated with a film that increases the rigidity of the workpiece W and that is machinable together with the workpiece W. Accordingly, pre-machining treatment is performed to increase the rigidity of the surface of the workpiece W. FIGS. 17A and 17B are schematic diagrams for describing one example of pre-machining treatment performed by a machining assistance system according to the present embodiment. As shown in FIG. 17A, a machining assistance system 1d includes a spraying device 16 provided at the distal end of an articulated arm 15 of a robot. The spraying device 16 sprays mist-like foamed urethane resin 17 out of its distal-end nozzle. As shown in FIG. 17B, by spraying the foamed urethane resin 17 onto the workpiece W, a film made of the foamed urethane resin 17 is formed on the surface of the workpiece W. As a result, the rigidity of the surface of the workpiece W is increased, and by machining the machining portion of the surface of the workpiece W together with the foamed urethane resin 17, the vibration occurring during the machining can be prevented. Alternatively, before performing the machining, a low-melting alloy may be adhered to the periphery of the workpiece W to coat the machining portion of the surface of the workpiece W with a film made of the low-melting alloy, and thereby the rigidity of the workpiece W may be improved temporarily. In this case, treatment to melt the adhered alloy is performed after the machining. Further alternatively, the rigidity of the workpiece W may be increased by coating the machining portion of the surface of the workpiece W with a thin clay film.

Other Embodiments

As another embodiment, at least two of the following configurations may be combined: a configuration where machining reaction force related data is detected by the dynamometer 9; a configuration where machining reaction force related data is detected by the current sensor 10 of the motor; a configuration where machining reaction force related data is measured by the vibration meter 11; and a configuration where machining reaction force related data is stored in the memory 8a in advance.

Although it has been described that the machining apparatus 2 of each of the above embodiments is configured to move the working tool 4a and fix the workpiece W by the workpiece retaining tool 3, the configuration of the machining apparatus 2 is not thus limited. Alternatively, the machining apparatus 2 may be configured to fix the working tool and move the workpiece W.

Although the supporting device 7 of each of the above embodiments is configured to move the workpiece supporting force generating unit 6 while supporting the workpiece supporting force generating unit 6 by the hand 7a provided at the distal end of the arm of the articulated arm robot 7, the supporting device may alternatively be configured as a dedicated device that includes a support mechanism and a moving mechanism.

From the foregoing description, numerous modifications and other embodiments of the present invention are obvious to a person skilled in the art. Therefore, the foregoing description should be interpreted only as an example and is provided for the purpose of teaching the best mode for carrying out the present invention to a person skilled in the art. The structural and/or functional details may be substantially altered without departing from the spirit of the present invention.

INDUSTRIAL APPLICABILITY

The present invention is applicable in machining a low-rigidity workpiece.

REFERENCE SIGNS LIST 1, 1b, 1c, 1d machining assistance system
2 machining apparatus
3 workpiece retaining tool
4 machining unit
5 machining control device
6 workpiece supporting force generating unit
7 supporting device
8 workpiece supporting force control device
9 dynamometer
10 current sensor
11 vibration meter
12 excitation device
13 vision sensor
15 robot arm
16 spraying device
17 foamed resin
W workpiece

The invention claimed is:

1. A machining assistance system for assisting a machining apparatus, the machining apparatus including: a workpiece retaining tool that retains a workpiece; a machining unit that machines the workpiece retained by the workpiece retaining tool by driving a working tool; and a machining control device that performs control of moving the machining unit relative to the workpiece retaining tool to position the working tool at a machining position, the machining assistance system comprising:
a workpiece supporting force generating unit that generates workpiece supporting force against machining reaction force that is exerted on a machining portion of the workpiece by the working tool;
a supporting device that moves the supporting force generating unit while supporting the supporting force generating unit; and
a workpiece supporting force control device that controls operation of the workpiece supporting force generating unit and operation of the supporting device based on machining reaction force related data related to the machining reaction force and machining position related data related to the machining position of the working tool, such that the workpiece supporting force generating unit exerts the workpiece supporting force on the workpiece against the machining reaction force, wherein:
the machining unit includes a rotating tool that is the working tool and a motor that drives the rotating tool, and the machining unit is configured to perform machining of the workpiece retained by the workpiece retaining tool by causing the rotating tool to rotate about a central axis of the rotating tool, the rotating tool being a columnar or discoid rotating tool with a cutting edge or grinding stone formed on its peripheral surface or distal end surface,
the workpiece supporting force generating unit includes a columnar rotary body and a rotation driver that causes the rotary body to rotate about a central axis of the rotary body, and
the workpiece supporting force control device is configured to, based on the machining reaction force related data and the machining position related data and by using the supporting device, perform:
control of an orientation and a position of the workpiece supporting force generating unit, such that the central axis of the rotary body is parallel to the central axis of the rotating tool, and the rotary body exerts pushing force on the workpiece against cutting reaction force that is exerted on the workpiece by the rotating tool; and
control of operation of the rotation driver to cause the rotary body to rotate, such that a rotational torque is exerted on the workpiece against a torque that is generated by the cutting reaction force.

2. The machining assistance system according to claim 1, wherein
the machining unit is configured to perform cutting of a side surface of the workpiece retained by the workpiece retaining tool by causing a columnar rotating cutting tool with a cutting edge formed on its peripheral surface to rotate about a central axis of the rotating cutting tool, and
the workpiece supporting force control device is configured to, based on the machining reaction force related data and the machining position related data and by using the supporting device, perform:

control of the orientation and the position of the workpiece supporting force generating unit, such that
the central axis of the rotary body is parallel to the central axis of the rotating cutting tool,
a peripheral surface of the rotary body faces the peripheral surface of the rotating cutting tool with the workpiece positioned in between, and
the peripheral surface of the rotary body exerts pushing force on the workpiece against cutting reaction force that is exerted on the workpiece by the rotating cutting tool; and control of operation of the rotation driver to cause the rotary body to rotate in the same direction as a rotation direction of the rotating cutting tool, such that a rotational torque is exerted on the workpiece against a torque that is generated by the cutting reaction force.

3. The machining assistance system according to claim 1, wherein
the machining unit is configured to perform cutting of a surface of the workpiece retained by the workpiece retaining tool by causing a columnar rotating cutting tool with a cutting edge formed on its distal end surface to rotate about a central axis of the rotating cutting tool, and
the workpiece supporting force control device is configured to, based on the machining reaction force related data and the machining position related data and by using the supporting device, perform:

control of the orientation and the position of the workpiece supporting force generating unit, such that
the central axis of the rotary body is parallel to the central axis of the rotating cutting tool,
a distal end surface of the rotary body faces the distal end surface of the rotating cutting tool with the workpiece positioned in between, and
the distal end surface of the rotary body exerts pushing force on the workpiece against cutting reaction force that is exerted on the workpiece by the rotating cutting tool; and control of operation of the rotation driver to cause the rotary body to rotate in a direction reverse to a rotation direction of the rotating cutting tool, such that a rotational torque is exerted on the workpiece against a torque that is generated by the cutting reaction force.

4. The machining assistance system according to claim 1, wherein
the machining unit is configured to perform grinding of a side surface of the workpiece retained by the workpiece retaining tool by causing a discoid rotating grinding tool with grinding stone formed on its peripheral surface to rotate about a central axis of the rotating grinding tool, and
the workpiece supporting force control device is configured to, based on the machining reaction force related data and the machining position related data and by using the supporting device, perform:

control of the orientation and the position of the workpiece supporting force generating unit, such that the central axis of the rotary body is parallel to the central axis of the rotating grinding tool, and the rotary body exerts pushing force on the workpiece against grinding reaction force that is exerted on the workpiece by the rotating grinding tool; and control of operation of the rotation driver to cause the rotary body to rotate, such that a rotational torque is exerted on the workpiece against a torque that is generated by the grinding reaction force.

5. The machining assistance system according to claim 1, further comprising a dynamometer that detects motive power exerted on the workpiece, wherein
the machining reaction force related data is the motive power detected by the dynamometer.

6. The machining assistance system according to claim 1, wherein
the machining assistance system further comprises a current sensor that detects an electric current flowing through the motor, and
the machining reaction force related data is a current value of the electric current flowing through the motor, the electric current being detected by the current sensor.

7. The machining assistance system according claim 1, further comprising a vibration meter that is provided on the workpiece retaining tool and that measures vibration of the workpiece retained by the workpiece retaining tool, wherein
the machining reaction force related data is the vibration measured by the vibration meter.

8. The machining assistance system according claim 1, further comprising a memory for storing the machining reaction force related data, wherein
the workpiece supporting force control device controls the operation of the workpiece supporting force generating unit and the operation of the supporting device based on the machining position related data and the machining reaction force related data stored in the memory.

9. The machining assistance system according to claim 1, wherein
the supporting device is an articulated arm robot that retains the workpiece supporting force generating unit by a hand, and
the workpiece supporting force control device is configured to control operation of the articulated arm robot and the operation of the workpiece supporting force generating unit.

10. The machining assistance system according to claim 1, wherein
the machining portion of a surface of the workpiece is coated with a film that increases rigidity of the workpiece and that is machinable together with the workpiece.

* * * * *